(12) United States Patent
Suzuki

(10) Patent No.: US 11,689,127 B2
(45) Date of Patent: Jun. 27, 2023

(54) ELECTRIC POWERED WORK MACHINE, AND METHOD FOR SUPPRESSING SURGE VOLTAGE IN ELECTRIC POWERED WORK MACHINE

(71) Applicant: MAKITA CORPORATION, Anjo (JP)

(72) Inventor: Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 49 days.

(21) Appl. No.: 17/511,019

(22) Filed: Oct. 26, 2021

(65) Prior Publication Data
US 2022/0131486 A1    Apr. 28, 2022

(30) Foreign Application Priority Data
Oct. 26, 2020   (JP) .................................. 2020-178980

(51) Int. Cl.
*H02P 6/28* (2016.01)
*H02P 27/08* (2006.01)
*B27B 9/00* (2006.01)
*B23D 45/16* (2006.01)

(52) U.S. Cl.
CPC ................ *H02P 6/28* (2016.02); *H02P 27/08* (2013.01); *B23D 45/16* (2013.01); *B27B 9/00* (2013.01)

(58) Field of Classification Search
CPC .... H02P 25/03; H02P 6/28; H02P 7/00; H02P 7/04; H02P 7/05; H02P 7/288; H02P 7/29; H02P 7/295; H02P 29/032; H02P 29/02; H02P 29/00; H02P 29/024; H02P 29/0241; H02P 27/00; H02P 27/04; H02P 27/06; H02P 21/22; H02P 21/34; H02P 23/07; H02P 25/00; H02P 25/022; H02P 9/006; H02P 9/10; H02P 9/38; H02P 1/00; H02P 1/04; H02P 1/18; H02P 1/423; H02P 1/46; H02P 1/465; H02P 1/34; H02P 1/24; B27B 9/00
See application file for complete search history.

(56) References Cited

U.S. PATENT DOCUMENTS 10,307,841 B2 * 6/2019 Yoshinari ............... B23D 47/12
2014/0210379 A1   7/2014 Kato et al.

FOREIGN PATENT DOCUMENTS

JP    2014-144496 A    8/2014

* cited by examiner

*Primary Examiner* — Antony M Paul
(74) *Attorney, Agent, or Firm* — Oliff PLC

(57) ABSTRACT

An electric powered work machine according to one aspect of to the present disclosure includes a motor. The electric powered work machine includes a first line connecting a positive electrode of a battery to the motor. The electric powered work machine includes a second line connecting a negative electrode of the battery to the motor. The electric powered work machine includes a third line connecting the first line to the second line. The electric powered work machine includes a first capacitor disposed on the third line. The electric powered work machine includes a rectifier disposed on the third line. The rectifier limits or inhibits an electric current flowing from the second line to the first line through the third line. The electric powered work machine includes a first circuit connected to the third line. The first circuit has impedance that is other than zero, and bypasses the rectifier.

19 Claims, 18 Drawing Sheets

ELECTRIC POWERED WORK MACHINE, AND METHOD FOR SUPPRESSING SURGE VOLTAGE IN ELECTRIC POWERED WORK MACHINE

CROSS-REFERENCE TO RELATED APPLICATIONS

This application claims the benefit of Japanese Patent Application No. 2020-178980 filed on Oct. 26, 2020 with the Japan Patent Office, the disclosure of which is incorporated herein by reference.

BACKGROUND

The present disclosure relates to an electric powered work machine.

Japanese Unexamined Patent Application Publication No. 2014-144496 disclosures an electric powered work machine including a capacitor that reduces a surge voltage. The surge voltage occurs due to a rapid decrease in an electric current flowing through an internal inductance of a battery. The capacitor is disposed between a power-supply line and a ground line. The power-supply line extends from a positive electrode of the battery to a motor. The ground line extends from a negative electrode of the battery to the motor.

SUMMARY

The surge current that occurs due to a line inductance flows through the capacitor. The line inductance includes (i) an inductance which exists in the power-supply line and (ii) an internal inductance of the battery. Also, a ripple current flows through this capacitor during a pulse width modulation (PWM) control. The ripple current includes a charging current and a discharging current for smoothing a battery voltage.

The ripple current continuously flowing through the capacitor is maximized when a current limiting function is performed by the PWM control. The current limiting function limits the battery current to a specified value (e.g., 40 amperes (A)). If a capacitance of the capacitor is sufficiently large and a duty ratio of the PWM control is 50%, then the ripple current has the same value as that of the battery current (e.g., 40 A).

On the other hand, a value of the surge current flowing through the capacitor is calculated based on a mean value of the surge current occurred in one period of the PWM control, in the following manner.

In one example, it is assumed that the battery current is 100 A, a current interruption time is 1 μsecond (s), a period of the PWM control is 50 μs, and the surge current during the current interruption is Ic[A]. The current interruption time is defined a time period in which the battery current decreases from 100 A to 0 A. In this case, a mean value of the surge current Ic is $(100[A]-0[A]) \times 1[\mu s]/50[\mu s]$, that is, 2 A.

The aforementioned example indicates that, if the capacitance of the capacitor is large enough to be needed for surge absorption and the duty ratio of the PWM control is 50%, then 5% of the electric current flowing through the capacitor is an electric current for surge absorption, whereas 95% of the electric current flowing through the capacitor is an electric current for purposes other than the surge absorption.

If the capacitor is unable to sufficiently absorb surge energy, an excessive surge voltage is expected to occur between a power-supply input terminal connected to the positive electrode of the battery and a power-supply input terminal connected to the negative electrode of the battery. Further, many factors influence fluctuation in the surge energy. Thus, unless the capacitance of the capacitor is a value with a sufficient margin for the minimum capacitance required for surge absorption, it is not possible to reduce the likelihood of a failure in an electric powered work machine caused by the surge voltage.

The internal impedance of the capacitor is smaller than an internal impedance of the battery. Thus, when a switch for conducting or interrupting the electric current to the motor is turned ON from OFF by the PWM control, the electric current flowing through the capacitor is greater than the electric current flowing through the power-supply line. Accordingly, the capacitance of the capacitor increases, the discharging amount of the capacitor (specifically, discharging current) also increases. An increased amount of heat generation in the capacitor is proportionate to the square of an increased amount of the discharging current.

In one aspect of the present disclosure, it is preferable to enable reduction in heat generation in a capacitor to suppress or avoid a surge voltage in an electric powered work machine.

An electric powered work machine according to one aspect of to the present disclosure includes a motor. The motor is driven with an electric power supplied from the battery. The battery includes a positive electrode and a negative electrode. The electric powered work machine includes a first line (or a power-supply line) connecting the positive electrode to the motor. The electric powered work machine includes a second line (or a ground line) connecting the negative electrode to the motor. The electric powered work machine includes a third line connecting the first line to the second line. The electric powered work machine includes a first capacitor (or a surge suppressing capacitor). The first capacitor is disposed on the third line. The electric powered work machine includes a rectifier. The rectifier is disposed on the third line. The rectifier limits or inhibits an electric current flowing from the second line to the first line through the third line. The rectifier does not substantially limit the electric current flowing from the first line to the second line through the third line. The electric powered work machine includes a first circuit (or a discharge path). The first circuit is connected to the third line. The first circuit bypasses the rectifier. The first circuit has an impedance that is other than zero. A discharging current from the first capacitor may flow through the first circuit.

Connecting the positive electrode to the motor via the first line may include connecting the positive electrode to the motor via a first switch (e.g., a semiconductor switch or an electronic switch). Connecting the negative electrode to the motor via the second line may include connecting the negative electrode to the motor via a second switch (e.g., a semiconductor switch or an electronic switch). The third line may be connected in parallel with the motor. The first capacitor may be connected in parallel with the motor. The first capacitor is capable of suppressing or avoiding a surge voltage. The surge voltage may occur due to a first inductance and/or a second inductance. The first inductance corresponds to an inductance of the battery. The second inductance corresponds to (i) an inductance of at least a part of the first line, and/or (ii) an inductance of at least a part of the second line. The rectifier may be connected in series with the first capacitor. Discharge from the first capacitor corresponds to release of electric charge stored in the first capacitor.

The first capacitor may be charged with a charging current. The charging current may be supplied from the first line to the first capacitor through the third line. The charging current can be supplied from the battery. The charging current may be generated due to the surge voltage. The first capacitor may discharge charging power (or the electric charge) to the first line through the third line. The charging power corresponds to an electric power charged to the first capacitor with the charging current.

The first circuit may reduce (suppress or limit) a performance of discharge from the first capacitor to the first line. The performance of discharge may include a discharge amount from the first capacitor to the first line, and/or a discharging rate from the first capacitor to the first line.

The electric powered work machine configured as above enables the rectifier to suppress discharge from the first capacitor. Suppression of the discharging current from the first capacitor may include reduction in an amount of the discharging current from the first capacitor to the first line, and/or in a discharging rate from the first capacitor to the first line. Consequently, without increasing capacitance of the first capacitor, it is possible to reduce heat generation in the first capacitor caused by the discharge from the first capacitor.

The rectifier may include a diode. The diode may be connected in series with the first capacitor. An anode of the diode may be connected to the first line. The anode of the diode may be connected to the first line through the first capacitor. A cathode of the diode may be connected to the second line. The cathode of the diode may be connected to the second line through the first capacitor. The first circuit may be connected in parallel with the diode.

In such electric powered work machine according to the present disclosure, discharge of the first capacitor is reduced by the diode. Further, the diode inhibits a voltage of the first capacitor from being lower than a voltage of the battery. This inhibits the first capacitor from being charged by the battery. The electric powered work machine configured as above inhibits a ripple current flowing through the first capacitor. Consequently, without increasing capacitance of the first capacitor, it is possible to reduce heat generation in the first capacitor caused by the ripple current flowing into the first capacitor. Suppression of the heat generation in the first capacitor in the electric powered work machine may avoid deterioration caused by the heat generation (e.g., decrease in capacitance). Such deterioration caused by the heat generation leads to increase in a surge voltage. Also, decrease in the deterioration caused by the heat generation may avoid occurrence of a failure caused by the increase in the surge voltage (specifically, a failure owing to overvoltage).

The first circuit may include a resistor. The electric powered work machine configured as above can ensure that a releasing path is provided for releasing surge energy absorbed by the first capacitor while the discharging current from the first capacitor can be controlled (or limited). Moreover, such limitation of discharging current enables a voltage of the first capacitor to be higher than the voltage of the battery. Accordingly, the first capacitor can be inhibited from being charged by anything other than a surge voltage.

The first circuit may include a second capacitor. The electric powered work machine configured as above provides a flow path of discharging current from the first capacitor when an electric power starts to be supplied from battery to the motor. This enables a shorter instantaneous interruption time of the battery.

The electric powered work machine may include a field effect transistor, which includes the rectifier and the first circuit.

In this case, a parasitic diode of the field effect transistor may correspond to the above-described rectifier (or the diode). Also, the field effect transistor that is turned ON may correspond to the first circuit (that is, function as the first circuit).

The electric powered work machine may include a control circuit. The control circuit may perform a pulse-width modulation (PWM) control. Specifically, the control circuit may control a supply of the electric power from the battery to the motor based on a PWM signal. The PWM signal includes a first frequency. The first circuit may include a resistor. A circuit including the first capacitor and the resistor that are connected in series has a cutoff frequency, which may be higher than the first frequency. The electric powered work machine configured as above can complete the discharge of the first capacitor within one period of the PWM control. The PWM signal may include a first period. The circuit, which includes the first capacitor and the resistor, may have a time constant shorter than the first period. The time constant may correspond to a product of the capacitance in the first capacitor and a resistance value of the resistor.

The first capacitor may have a first capacitance. The second capacitor may have a second capacitance. The second capacitance may be smaller than the first capacitance.

The electric powered work machine may a first control circuit and a second control circuit. The first control circuit may perform the PWM control. Specifically, the first control circuit may control the supply of the electric power from the battery to the motor based on a PWM signal. The PWM signal has a duty ratio. The first control circuit may perform a power-supply-ON operation and a power-supply-OFF operation. The power-supply-ON operation may include supplying the electric power from the battery to the motor in accordance with the duty ratio. The power-supply-OFF operation may include interrupting the supply of the electric power from the battery to the motor in accordance with the duty ratio. The second control circuit may perform a switching control. The switching control includes alternately switching ON and OFF the field effect transistor. Specifically, the second control circuit may (i) turn ON the field effect transistor at a first timing, and then (ii) turn OFF the field effect transistor at a second timing. The first timing corresponds to a time point earlier by a first time period than a start of the power-supply-OFF operation, or a time point later by a second time period than the start of the power-supply-OFF operation. The second timing corresponds to a time point earlier by a third time period than a start of the power-supply-ON operation for the first time after the first timing. The first timing may correspond to a time point immediately before the power-supply-OFF operation starts, or immediately after the power-supply-OFF operation starts. The electric powered work machine configured as above allows the parasitic diode to be short-circuited while the surge voltage occurs, thereby to flow a surge current through the first capacitor and the field effect transistor. This enables decrease in heat generation in the parasitic diode caused by the surge current.

The first control circuit may perform the power-supply-ON operation. The second control circuit may turn ON the field effect transistor at a third timing. The third timing corresponds to a time point earlier by a fourth time period than a start of the power-supply-ON operation, or to a time point at the start of the power-supply-ON operation. The second control circuit may turn OFF the field effect transistor that is turned ON at the third timing. The electric powered work machine configured as above can supply a rush current from the first capacitor to the motor when the power-supply-ON operation is performed. The rush current flows toward the motor via the power-supply line when the power-supply-ON operation is performed (e.g., at time of starting).

The rectifier may be disposed between the first capacitor and the second line. In the case where the rectifier disposed between the first capacitor and the second line includes the diode, the anode of the diode may be connected to the first capacitor.

The rectifier may be disposed between the first line and the first capacitor. In the case where the rectifier disposed between the first line and the first capacitor includes the diode, the cathode of the diode may be connected to the first capacitor.

The electric powered work machine may include a first measurement device and a first processor. The first measurement device measures a surge voltage and a battery voltage during the motor being stopped. The surge voltage occurs between the first line and the second line. The battery voltage corresponds to a voltage of the battery. The first processor executes a first processing in response to the surge voltage or the battery voltage that is measured by the first measurement device being not greater than a first threshold or not less than a second threshold. The first threshold is smaller than the second threshold. The first threshold and/or the second threshold may be set in advance. The first processing may include determining that a failure occurs in the electric powered work machine. The electric powered work machine configured as above enables detection of a failure in the first measurement device based on the surge voltage and the battery voltage.

The electric powered work machine may include a second measurement device and a second processor. The second measurement device measures a surge voltage and a battery voltage during the motor being driven. The second processor executes a second processing in response to a difference between the surge voltage and the battery voltage that are measured by the second measurement device being out of a first range. The first range may be set in advance. The second processing may include determining that a failure occurs in the electric powered work machine. The electric powered work machine configured as above enables detection of a failure in the second measurement device and the first capacitor based on the surge voltage and the battery voltage.

The electric powered work machine may include a control circuit. The control circuit may include a first input port, a second input port, a level setter, and a third processor.

The first input port receives a first signal in accordance with a magnitude of the battery voltage. The first signal may indicate a value in accordance with the magnitude of the battery voltage. The second input port receives a second signal in accordance with a magnitude of the surge voltage. The second signal may indicate a value in accordance with the magnitude of the surge voltage.

The level setter sets a voltage level of a target port to a high level or a low level. The target port corresponds to the first port or the second port.

The third processor executes a third processing in the case where a voltage of a non-target port is varied by setting the voltage level of the target port to the high level or the low level by the level setter. The non-target port corresponds to the first input port or the second input port, which is different from the target port. In other words, the non-target port is a port that is not set the voltage level to a high level or a low level by the level setter. The third processing may include determining that a failure occurs in the electric powered work machine.

The electric powered work machine configured as above can detect, based on the surge voltage and the battery voltage, a short-circuit failure in each of the lines where each of the surge voltage and the battery voltage is measured.

Another aspect of the present disclosure provides a method for suppressing a surge voltage generated in an electric powered work machine, the method including:

disposing a first capacitor in an electric powered work machine, the electric powered work machine including a motor, a first line, a second line, and a third line, the first line connecting a positive electrode of a battery to the motor, the second line connecting a negative electrode of the battery to the motor, the third line connecting the first line to the second line, the first capacitor being disposed on the third line;

disposing a rectifier on the third line, the rectifier configured to limit or inhibit an electric current flowing from the second line to the first line through the third line; and connecting a first circuit to the third line to bypass the rectifier, the first circuit having impedance that is other than zero.

The method described above can exercise the effects similar to those of the above-described electric powered work machine.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

First Embodiment

Figure 1:
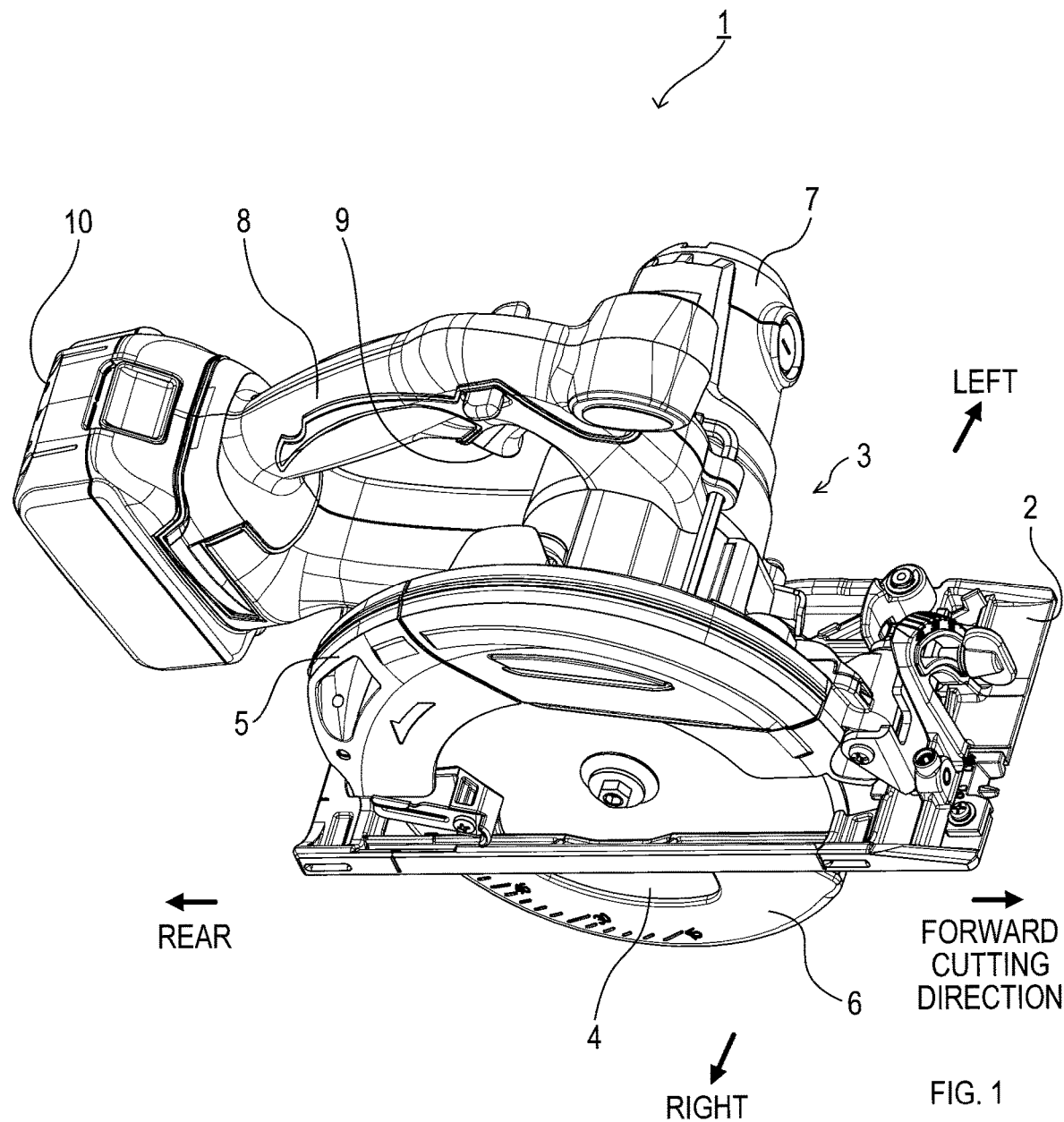
FIG. 1 is a perspective view showing a configuration of an entire electric powered work machine.

As shown in FIG. 1, an electric powered work machine 1 of a first embodiment is configured as an electric circular saw. The electric circular saw is used for cutting workpieces.

The electric powered work machine 1 includes a base 2 and a main body 3. The base 2 is a substantially rectangular-shaped member. The base 2 is in contact with an upper surface of a workpiece when a workpiece is cut by the electric powered work machine 1. The main body 3 is disposed on an upper-surface side of the base 2.

The main body 3 includes a saw blade 4, a saw blade case 5, and a cover 6. The saw blade 4 has a circular shape. The saw blade 4 is disposed on a right side relative to the main body 3 in a forward cutting direction. The saw blade case 5 covers (or houses) an upper portion of the saw blade 4. That is, the saw blade case 5 internally houses (or covers) a first peripheral edge of the saw blade 4. The first peripheral edge corresponds to a substantially semicircular extent of a circumference edge of the saw blade 4.

The cover 6 covers a second peripheral edge of the saw blade 4. The second peripheral edge corresponds to a substantially lower half part of the circumference edge of the saw blade 4. The cover 6 is designed to open and close. FIG. 1 shows a state in which the cover 6 is closed. The cover 6 is opened when the electric powered work machine 1 is operated to cut the workpiece. Specifically, when the electric powered work machine 1 is moved in the forward cutting direction, the cover 6 rotates about a rotational axis of the saw blade 4 in a clockwise direction as illustrated in FIG. 1. This rotation causes the cover 6 to be gradually opened, thereby exposing the saw blade 4. The exposed portion of the saw blade 4 proceeds to cut into the workpiece.

Figure 2:
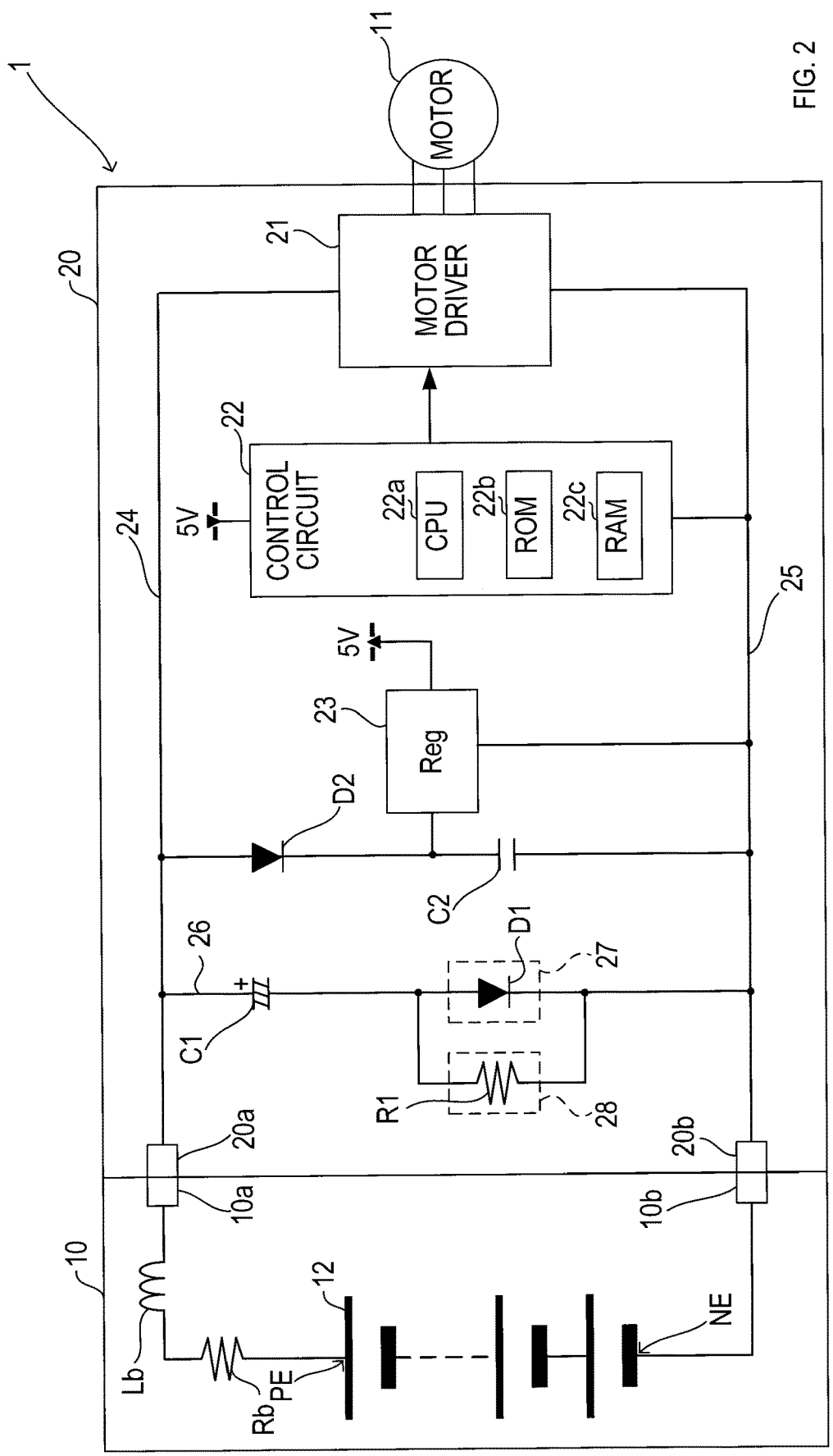
FIG. 2 is a block diagram showing an electrical configuration of an electric powered work machine of a first embodiment.

A motor case 7 is provided on a left side relative to the main body 3. The motor case 7 has a substantially cylindrical shape. The motor case 7 internally houses a motor 11. The motor 11 serves as a drive source of the electric powered work machine 1. The motor 11 is not shown in FIG. 1, but is shown in FIG. 2.

A gear mechanism (not shown) is housed between the motor case 7 and the saw blade 4. Rotation of the motor 11 is transmitted to the saw blade 4 via the gear mechanism. The rotation of the motor 11 is transmitted to the saw blade 4, thereby rotating the saw blade 4.

A handle 8 is disposed on an upper side of the main body 3. The handle 8 is gripped by a user of the electric powered work machine 1. The handle 8 is mounted on the upper side of the main body 3 so as to be formed in an arch-like shape. Specifically, the handle 8 has a first end fixed to a rear portion of the main body 3 in the forward cutting direction. The handle 8 has a second end fixed to a front portion of the main body 3 in the forward cutting direction.

A trigger switch 9 is mounted on the handle 8. The user can pull or release the trigger switch 9 while gripping the handle 8. A lock-off lever is disposed in the vicinity of the trigger switch 9. The lock-off lever protrudes in a left-right direction of the handle 8. The user can pull the trigger switch 9 while manipulating the lock-off lever. Specifically, the user can pull the trigger switch 9 by pressing the lock-off lever from the left side or the right side.

A battery pack 10 is detachably attached to a rear end of the main body 3. The battery pack 10 houses a rechargeable battery 12. When the trigger switch 9 is pulled in a state where the battery pack 10 is attached to the main body 3, the motor 11 is supplied with an electric power from the battery 12 to rotate. The battery 12 is not shown in FIG. 1, but is shown in FIG. 2.

As shown in FIG. 2, the electric powered work machine 1 includes a controller 20. The controller 20 includes a first power-supply terminal 20a and a first ground terminal 20b. The battery pack 10 includes a second power supply-terminal 10a and a second ground terminal 10b. When the battery pack 10 is mounted on the main body 3, the first power-supply terminal 20a is connected to the second power-supply terminal 10a, and the first ground terminal 20b is connected to the second ground terminal 10b.

The second power-supply terminal 10a is connected to a positive electrode PE of the battery 12. The second ground terminal 10b is connected to a negative electrode NE of the battery 12. The battery 12 includes a resistance (or an internal resistance) Rb and an inductance Lb (or an internal inductance Lb; hereinafter, referred to as "battery inductance Lb"). In other words, equivalently, the battery 12 can be considered to have a configuration such that a voltage source generating a voltage, the resistance Rb is connected in series with the battery inductance Lb. Referring to FIG. 2, the resistance Rb and the battery inductance Lb are shown separated from the battery 12, for convenience of explanation.

The controller 20 receives the supply of the electric power from the battery 12. The controller 20 drives and controls the motor 11. In the first embodiment, the motor 11 is a three-phase brushless motor, and includes three windings (not shown). The motor 11 is not limited to the three-phase brushless motor, and may be any type of motor. The motor 11 is driven with the electric power supplied from the battery 12.

The controller 20 includes a motor driver 21. The motor driver 21 includes drive switches (not shown). Each of the drive switches may include a semiconductor switch or an electronic switch, for example. The drive switches may include a drive switch (hereinafter, referred to as a "high-side switch") that is connected to the first power-supply terminal 20a via a power-supply line 24. The drive switches may include a drive switch (hereinafter, referred to as a "low-side switch") that is connected to the first ground terminal 20b via a ground line 25.

The motor driver 21 turns on or off the drive switches in accordance with control signals that are output from a control circuit 22. The motor driver 21 turns on or off each drive switch, thereby to supply an electric current to each winding of the motor 11 to rotate the motor 11.

The controller 20 includes the control circuit 22. The control circuit 22 in the first embodiment is in the form of a microcomputer including at least a CPU 22a, a ROM 22b, and a RAM 22c. In the control circuit 22, various functions are achieved when the CPU 22a executes a program stored (memorized) on non-transitory tangible storage medium. In the first embodiment, the ROM 22b corresponds to one example of the non-transitory tangible storage medium. The program stored in the ROM 22b is executed, thereby to perform a step corresponding to the executed program. The control circuit 22 may include additional microcomputers.

The control circuit 22 is not limited to a microcomputer. In other embodiments, some or all of the functions executed by the CPU 22a may be achieved by one or some of hardware. For example, the control circuit 22 may include a logic circuit including a plurality of electronic components, in place of or addition to the microcomputer. The control circuit 22 may include integrated circuits for particular applications, such as an Application Specified Integrated Circuit (ASIC) and an Application Specific Standard Product (ASSP), or include a programmable logic device that can be configured any desired circuit, for example, a Field Programmable Gate Array (FPGA).

The control circuit 22 performs a motor control. The motor control includes control of the supply of an electric power to the motor 11 by outputting the control signals described above to the motor driver 21. In the first embodiment, the motor control includes, for example, pulse-width modulation (PWM) control. The control signals incudes a PWM signal used in the PWM control. The PWM signal is a signal that is pulse-width modulated in accordance with a value of an electric current to be supplied to the motor 11. The PWM signal includes a duty ratio in accordance with the value of current to be supplied to the motor 11. In the following description, a frequency of the PWM signal is referred to as a PWM frequency, and a period of PWM signal is referred to as a PWM period. The PWM frequency corresponds to one example of a first frequency according to the present disclosure.

The PWM control includes PWM-driving of a PWM switch while an ON-fixed switch remains ON. The ON-fixed switch is the high-side switch or the low-side switch. The PWM switch is the high-side switch or the low-side switch, and distinct from the ON-fixed switch. The PWM-driving corresponds to turning on or off the PWM switch with the PWM signal. Specifically, the PWM switch is periodically turned on or off in the PWM period, in accordance with the PWM signal.

The PWM-driving includes a PWM-ON operation and a PWM-OFF operation. The PWM-ON operation corresponds to one example of a power-supply-ON operation according to the present disclosure. The PWM-OFF operation corresponds to one example of a power-supply-OFF operation according to the present disclosure.

The PWM-ON operation corresponds to turning on the PWM switch with the PWM signal (and thus, supplying the electric power to the motor 11 from the battery 12 in accordance with the duty ratio). A time-period where the PWM-ON operation is performed (hereinafter, referred to as "PWM-ON time-period") corresponds to a time-period where a pulse signal of the PWM signal is generated.

The PWM-OFF operation corresponds to turning off the PWM switch with the PWM signal (and thus, interrupting the supply of the electric power to the motor 11 from the battery 12 in accordance with the duty ratio). A time-period where the PWM-OFF operation is performed (hereinafter, referred to as "PWM-OFF time-period") corresponds to a time-period where a pulse signal of the PWM signal is not generated.

In the PWM-driving, the PWM-ON operation and the PWM-OFF operation are alternately performed in one PWM period. The control circuit 22 controls the PWM-ON time-period in a PWM period (that is, controls the duty ratio), thereby to control the motor 11.

The controller 20 includes the power-supply line 24. The power-supply line 24 extends from the first power-supply terminal 20a to the motor 11 through the motor driver 21. The power-supply line 24 connects the positive electrode PE of the battery 12 to the motor 11 via the motor driver 21.

The controller 20 includes the ground line 25. The ground line 25 extends from the first ground terminal 20b to the motor 11 through the motor driver 21. The ground line 25 connects the negative electrode NE of the battery 12 to the motor 11 via the motor driver 21.

The controller 20 includes a connecting line 26. The connecting line 26 connects the power-supply line 24 to the ground line 25. A first end of the connecting line 26 is connected to the power-supply line 24. A second end of the connecting line 26 is connected to the ground line 25.

The controller 20 includes the aforementioned first capacitor (or a surge suppressing capacitor) C1. The first capacitor C1 is disposed on the connecting line 26. The first end of the first capacitor C1 is connected to the power-supply line 24.

The controller 20 includes a rectifier 27. The rectifier 27 is disposed on the connecting line 26. In the first embodiment, the rectifier 27 is disposed between the first capacitor C1 and the ground line 25 in the connecting line 26.

In the first embodiment, the rectifier 27 includes a first diode D1. A second end of the first capacitor C1 is connected to an anode of the first diode D1. A cathode of the first diode D1 is connected to the ground line 25. The first diode D1 limits or inhibits an electric current flowing from the ground line 25 to the power-supply line 24 via the connecting line 26. In other words, the first diode D1 limits or avoids discharge from the first capacitor C1 to the power-supply line 24. The rectifier 27 may include a component or a circuit, which is different from the diode D1. The rectifier 27 may include any component or circuit capable of limiting or inhibiting the electric current flowing from the ground line 25 to the power-supply line 24 via the connecting line 26 (or via the rectifier 27).

The controller 20 includes a first circuit 28. The first circuit 28 is connected between both ends of the rectifier 27. The first circuit 28 has an impedance that is other than zero.

In the first embodiment, the first circuit 28 includes a resistor R1. A first end of the resistor R1 is connected to an anode of the first diode D1. A second end of the resistor R1 is connected to a cathode of the first diode D1. In the first embodiment, the resistor R1 is connected in parallel with the first diode D1.

The first capacitor C1 absorbs energy of the battery inductance Lb to suppress increase in a surge voltage.

The surge voltage indicates a voltage generated by changes in an electric current flowing through a line inductance. The surge voltage occurs between the first ground terminal 20b and the first power-supply terminal 20a, for example. The line inductance includes the battery inductance Lb. The line inductance may further include a first parasitic inductance and/or a second parasitic inductance. The first parasitic inductance corresponds to a parasitic inductance of a path disposed between a positive electrode of the battery 12 and the second power-supply terminal 10a in the battery pack 10. The second parasitic inductance corresponds to at least portion of a parasitic inductance in the power-supply line 24.

Let "L" be a value of the line inductance, and let "I" be a value of current flowing through the power-supply line 24, then a value of surge voltage can be obtained by an expression "$-L \times dI/dt$".

The controller 20 includes a regulator 23. The controller 20 includes the second diode D2 and a capacitor C2. An anode of the second diode D2 is connected to the power-supply line 24. A second end of the second diode D2 is connected to a first end of the capacitor C2 and the regulator 23. The second end of the capacitor C2 is connected to the ground line 25. The regulator 23 receives the supply of the electric power from the battery 12 via the first power-supply terminal 20a and the second diode D2. The regulator 23 generates a voltage, for example, 5 volts (V), for operating the control circuit 22.

Next, the following describes the smallest capacitance of the first capacitor, which is a value for reducing a surge voltage to be a specified value or below. The smallest capacitance is the minimum value of a capacitance capable of keeping a voltage of the first capacitor C1 within a tolerance when all energy stored in the line inductance is transferred to the first capacitor C1.

The smallest capacitance can be obtained from the energy stored (or accumulated) in the line inductance as well as the maximum value of the voltage allowed in the first capacitor C1.

For example, it is assumed that the line inductance is 1 μhenry (H), the electric current flowing through the line inductance is 100 A, and the maximum value in the above-described tolerance is 20V. In this case, as shown in the expression (1), the smallest capacitance of the first capacitor C1 is 25 μfarad (F).

$$\frac{1}{2} \times L \times I^2 \leq \frac{1}{2} \times C \times V^2 \quad (1)$$

$$C \geq L \times \left(\frac{I}{V}\right)^2$$

$$\geq 1\ [\mu H] \times \left(\frac{100\ [A]}{20\ [V]}\right)^2$$

$$\geq 25\ [\mu F]$$

In the present embodiment, the capacitance of the first capacitor C1 is, for example, 100 μF. The capacitance of the first capacitor C1 corresponds to one example of the first capacitance according to the present disclosure.

A resistance value of the resistor R1 may be set such that a cutoff frequency of a circuit including both the first capacitor C1 and the resistor R1 is higher than the PWM frequency. In other words, the resistance value of the resistor R1 may be set such that a time constant determined based on the first capacitor C1 and the resistor R1 is shorter than the PWM period. The time constant corresponds to a product of the capacitance in the first capacitor C1 and a resistance value of the resistor R1.

Figure 3:
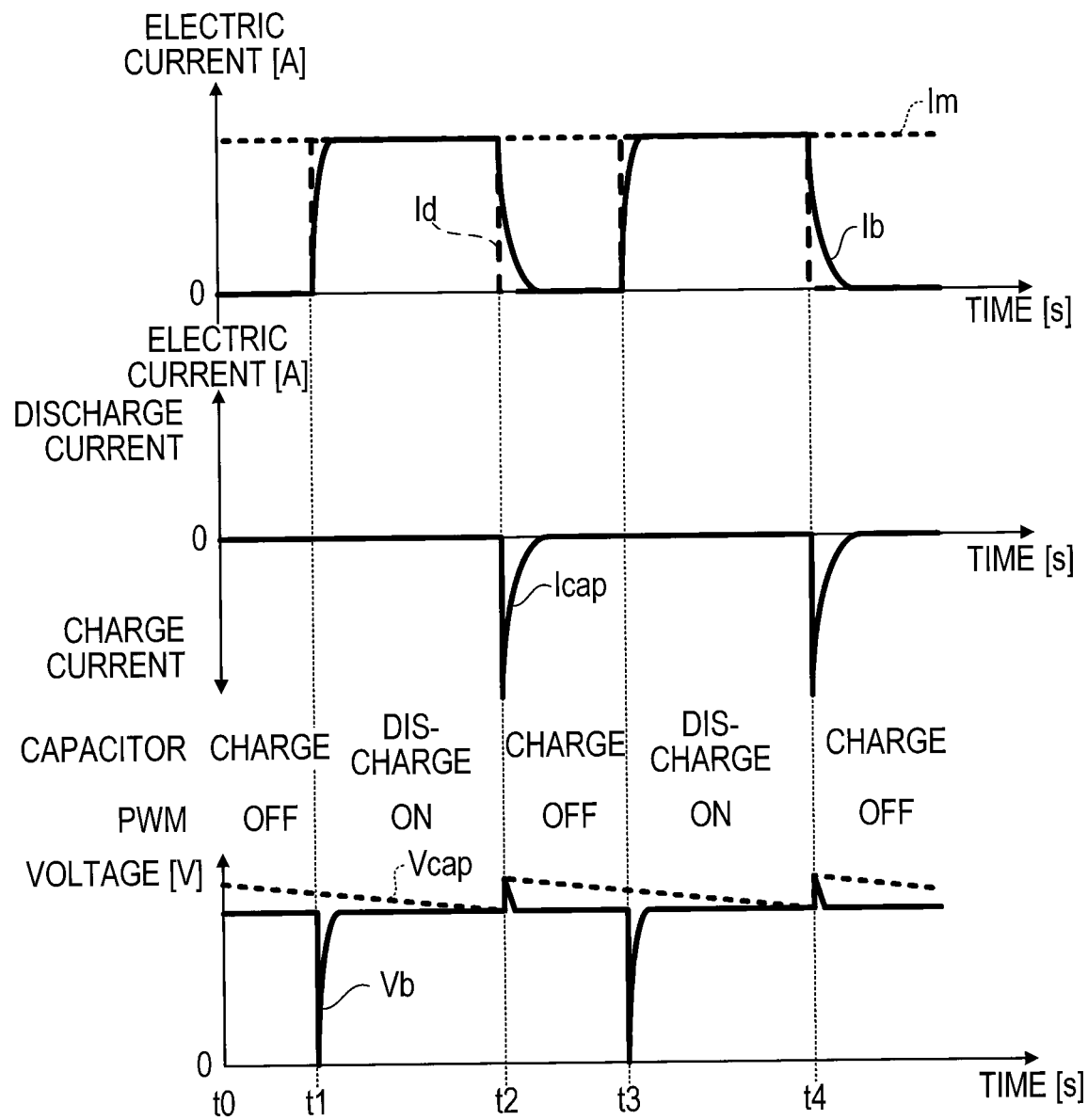
FIG. 3 is a diagram showing a time variation in different electric currents and different voltages of the first embodiment.

FIG. 3 a diagram showing one example of a time variation in a motor current Im, a driver electric current Id, a battery current Ib, a capacitor current Icap, a power-supply terminal voltage Vb, and a capacitor voltage Vcap while the PWM control is performed in the electric powered work machine 1 in the first embodiment.

The motor current Im is the electric current flowing through the motor 11 (specifically, the electric current flowing through the winding of the motor 11, for example). The electric current that has flown in the motor 11 in the PWM-ON time-period flows back in a flyback path even after transition to the PWM-OFF time-period, owing to an inductance of the winding of the motor 11. The flyback path is a loop-like current path, which includes the motor 11 and the motor driver 21. This causes a constant amount of the electric current to continuously flow in the motor 11.

The driver electric current Id is an electric current flowing from the power-supply line 24 to the motor driver 21. The PWM-ON time-period is considered a period where the ON-fixed switch, the motor 11, and the PWM switch with being turned on are connected in series between the positive electrode PE and the negative electrode NE. Thus, an electric current value of the driver electric current Id in the PWM-ON time-period is equal to an electric current value of the motor current Im, for example. In the PWM-OFF time-period, all high-side switches or all low-side switches within the motor driver 21 are turned off. Accordingly, the electric current value of the driver electric current Id in the PWM-OFF time-period is 0 A, for example.

The battery current Ib is an electric current supplied from the battery 12 to the controller 20. The capacitor current Icap is an electric current flowing through the first capacitor C1. The power-supply terminal voltage Vb is a voltage across the first power-supply terminal 20a and the first ground terminal 20b. The capacitor voltage Vcap is a voltage across both ends of the first capacitor C1 (that is, a charge voltage).

As shown in FIG. 3, time t0 to time t1, time t2 to time t3, and after time t4 (It is noted that it is within a range in FIG. 3) correspond to the PWM-OFF time-periods. Time t1 to time t2, and time t3 to time t4 correspond to the PWM-ON time-periods.

When the PWM-driving is switched from the PWM-OFF operation to the PWM-ON operation at time t1 and time t3, the battery current Ib rapidly increases from 0 A. Such a rapid increase in the battery current Ib leads to a drastic drop in the power-supply terminal voltage Vb. This causes instantaneous interruption of the battery 12 to occur. The instantaneous interruption means that, for example, a voltage value temporarily or instantaneously drops to zero or nearly zero. The discharge from the first capacitor C1 is suppressed or avoided by the first diode D1.

When the PWM-driving is switched from the PWM-ON operation to the PWM-OFF operation at time t2 and time t4, the battery current Ib decreases to 0 A. It is noted that a falling time of the battery current Ib is longer than a falling time of the driver electric current Id. The fact that the falling time or the rising time is long (or short) means that a falling speed or a rising speed is low (or high), respectively.

At the instant when the PWM-driving is switched from the PWM-ON operation to the PWM-OFF operation at time t2 and time t4, the same (or almost the same) magnitude of the capacitor current Icap (herein, the charging current) as that of the motor current Im flows through the first capacitor C1. However, this charging current quickly converges to 0 A.

Specifically, the battery current Ib that has flown just before the PWM-ON operation is switched to the PWM-OFF operation (that is, the motor current Im) flows through the first capacitor C1 simultaneously with the start of the PWM-OFF operation. At this time a magnitude of the electric current flowing through the first capacitor C1 (that is, charging current) is the same (or almost the same) as a magnitude of the battery current Ib just before the PWM-OFF operation is started. In other words, although a path of the battery current Ib varies in the controller 20 before or after the PWM-OFF operation is started, the magnitude of the battery current Ib does not (or almost not) vary. Accordingly, no drastic change in the battery current Ib occurs, and thus an excessive surge voltage does not occur. In other words, the surge energy is absorbed (specifically, charged)

into the first capacitor C1. This increases the capacitor voltage Vcap. The surge energy corresponds to the energy stored in the line inductance.

The electric power (or the electric charge) charged in the first capacitor C1 is discharged via the resistor R1. This temporarily increases the capacitor voltage Vcap at a start of the PWM-OFF operation; however, it gradually decreases. It is noted that the first capacitor C1 absorbs the surge voltage (specifically, the surge energy is absorbed), and thus the capacitor voltage Vcap is higher than the power-supply terminal voltage Vb. Accordingly, at least in the example shown in FIG. 3, the first capacitor C1 is not charged by the battery 12.

Further, a time derivative value of the battery current Ib in a decreasing direction at the start of the PWM-OFF operation is smaller than that of the battery current Ib in an increasing direction at the start of the PWM-ON operation. Thus, although the power-supply terminal voltage Vb rapidly decreases at a start of the PWM-ON operation, a surge voltage at the start of the PWM-OFF operation remains low.

If an instantaneous interruption in the battery 12 that occur simultaneously with the start of the PWM-ON operation is an acceptable, the charging current that flows through the first capacitor C1 can be limited only to the surge current, regardless of the capacitance of the first capacitor C1. It is noted that an input electric power of the regulator 23 is backed up by the second diode D2 and the capacitor C2. Thus, the instantaneous interruption in the battery 12 practically has no influence on an operation of the regulator 23.

Figure 4:
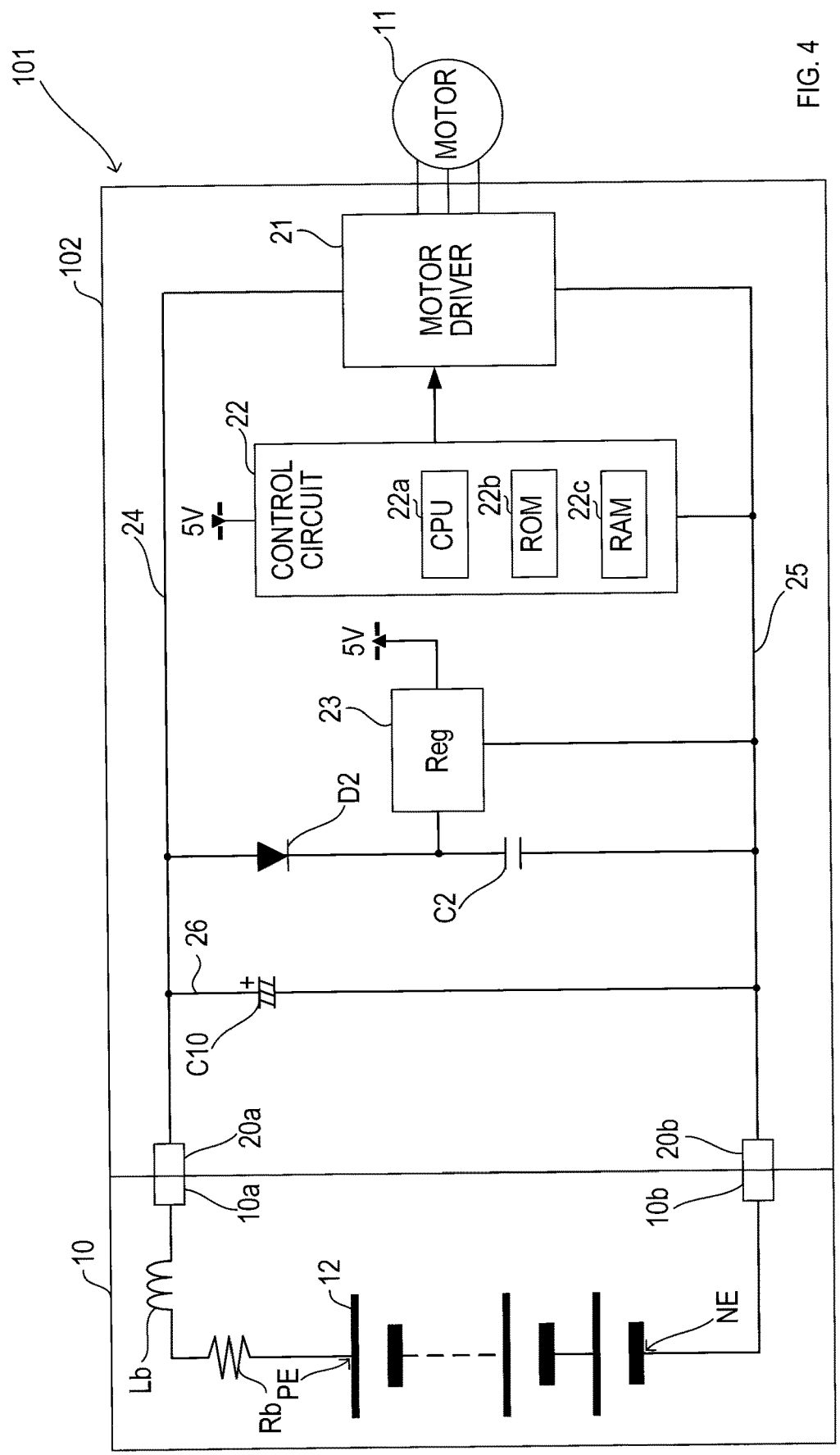
FIG. 4 is a block diagram showing an electrical configuration of an electric powered work machine of a first comparative example.

FIG. 4 is a diagram showing an electric powered work machine 101 in the first comparative example. The electric powered work machine 101 is different from the electric powered work machine 1 in the first embodiment (FIG. 2) in that a controller 102 of the electric powered work machine 101 does not include the rectifier 27 and the first circuit 28.

In the first comparative example, a first end of the first capacitor C10 is connected to the power-supply line 24, similarly to the first capacitor C1 shown in FIG. 2. On the other hand, the second end of the first capacitor C10 is connected to the ground line 25.

The capacitance of the first capacitor C10 has a capacitance enough to suppress occurrence of the surge voltage. The capacitance of the first capacitor C10 is, for example, several hundreds μF. In other words, the capacitance of the first capacitor C10 in the first comparative is larger than the capacitance (e.g., 100 μF) of the first capacitor C1 shown in FIG. 2.

Figure 5:
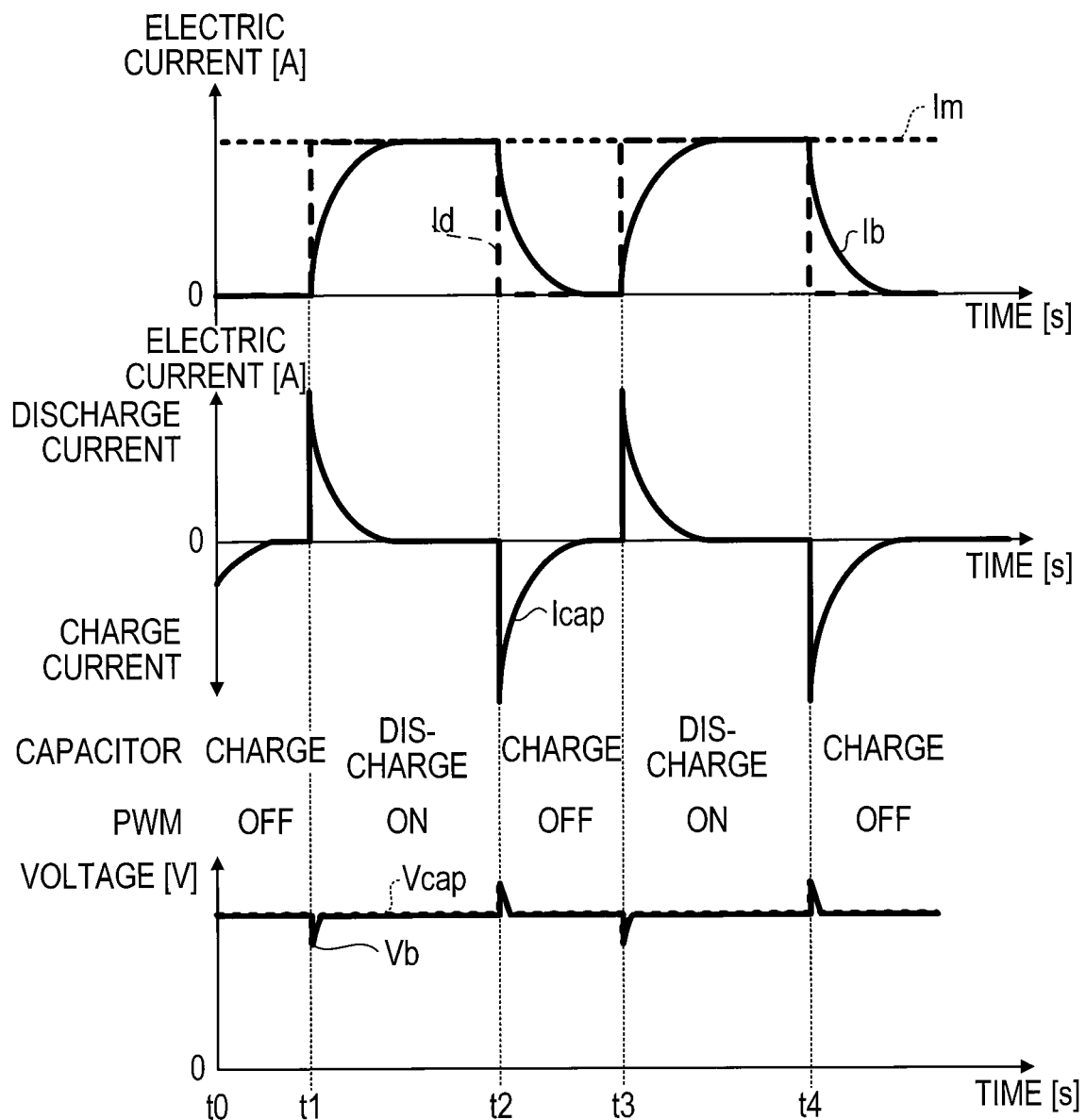
FIG. 5 is a diagram showing a time variation in different electric currents and different voltages of the first comparative example.

FIG. 5 a diagram showing one example of a time variation in the motor current Im, the driver electric current Id, the battery current Ib, the capacitor current Ieap, the power-supply terminal voltage Vb, and the capacitor voltage Vcap while the PWM control is performed in the electric powered work machine 101 in the first comparative example.

The PWM-driving is switched from the PWM-OFF operation to the PWM-ON operation at time t1 and time t3, the battery current Ib increases from 0 A. However, the rising time of the battery current Ib of the electric powered work machine 101 is longer than the rising time of the battery current Ib of the electric powered work machine 1 in the first embodiment. Further, simultaneously with the start of the PWM-ON operation, the same (or almost the same) magnitude of the capacitor current Ieap (herein, a discharging current) as that of the motor current Im flows through the first capacitor C10. However, this discharging current gradually converges to 0 A. Further, the power-supply terminal voltage Vb and the capacitor voltage Vcap instantaneously drop at the start time of the PWM-ON operation.

When the PWM-driving is switched from the PWM-ON operation to the PWM-OFF operation at time t2 and time t4, the battery current Ib decreases to 0 A. However, the falling time of the battery current Ib of the electric powered work machine 101 is longer than the falling time of the battery current Ib of the electric powered work machine 1 in the first embodiment. Further, simultaneously with the start of the PWM-OFF operation, the same (or almost the same) magnitude of the capacitor current Icap (herein, charging current) as that of the motor current Im flows through the first capacitor C10. However, this charging current gradually converges to 0 A. Further, the power-supply terminal voltage Vb and the capacitor voltage Vcap instantaneously increase at the start time of the PWM-OFF operation.

Switching between the PWM-ON operation and the PWM-OFF operation alternately generates a pulse-like driver electric current Id. The first capacitor C11 is charged or discharged in response to change in the driver electric current Id, thereby eliminating a sudden change in the battery current Ib. Accordingly, the surge voltage does not occur (or mostly does not occur).

Not only the surge current, but also a ripple current caused by the PWM-driving flows through the first capacitor C10. Consequently, the first capacitor C10 generates heat caused by an equivalent series resistance (ESR) of the first capacitor C10. The first comparative example addresses such heat generation by increasing the first capacitor C10 in size. This increases the capacitance of the first capacitor C10 more than is needed.

Figure 6:
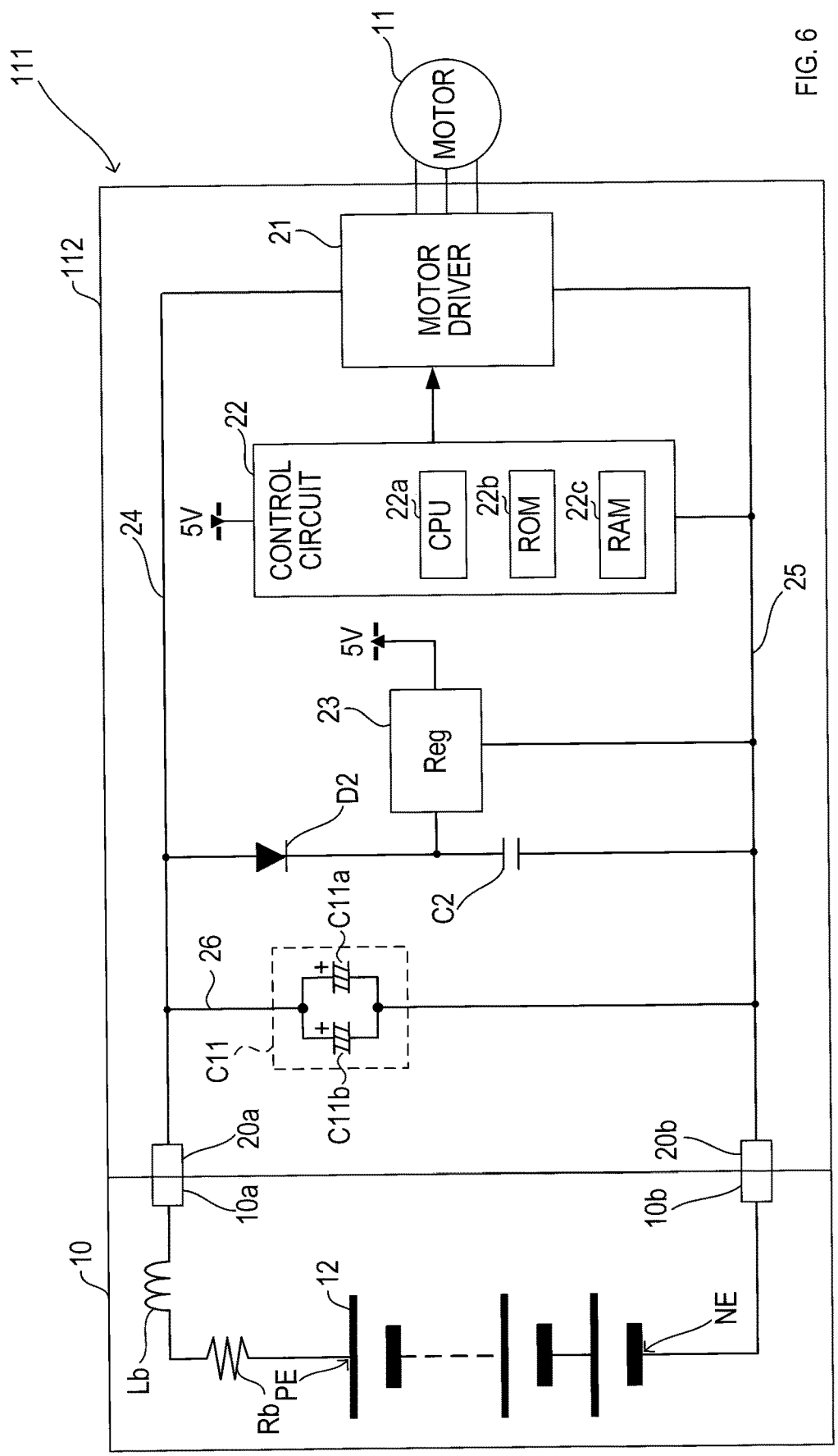
FIG. 6 is a block diagram showing an electrical configuration of an electric powered work machine of a second comparative example.

FIG. 6 is a diagram showing an electric powered work machine 111 of a second comparative example. The electric powered work machine 111 is different from the electric powered work machine 101 in the first comparative example (FIG. 4) in that a controller 112 includes a first capacitor C11, instead of the first capacitor C10 in the first comparative example.

A first end of the first capacitor C11 is connected to the power-supply line 24. A second end of the first capacitor C11 is connected to the ground line 25. An capacitance of the first capacitor C11 exceeds 1000 μF. Specifically, the first capacitor C11 includes a capacitor C11a and a capacitor C11b interconnected in parallel. The capacitors C11a and C11b are each large in size.

Figure 7:
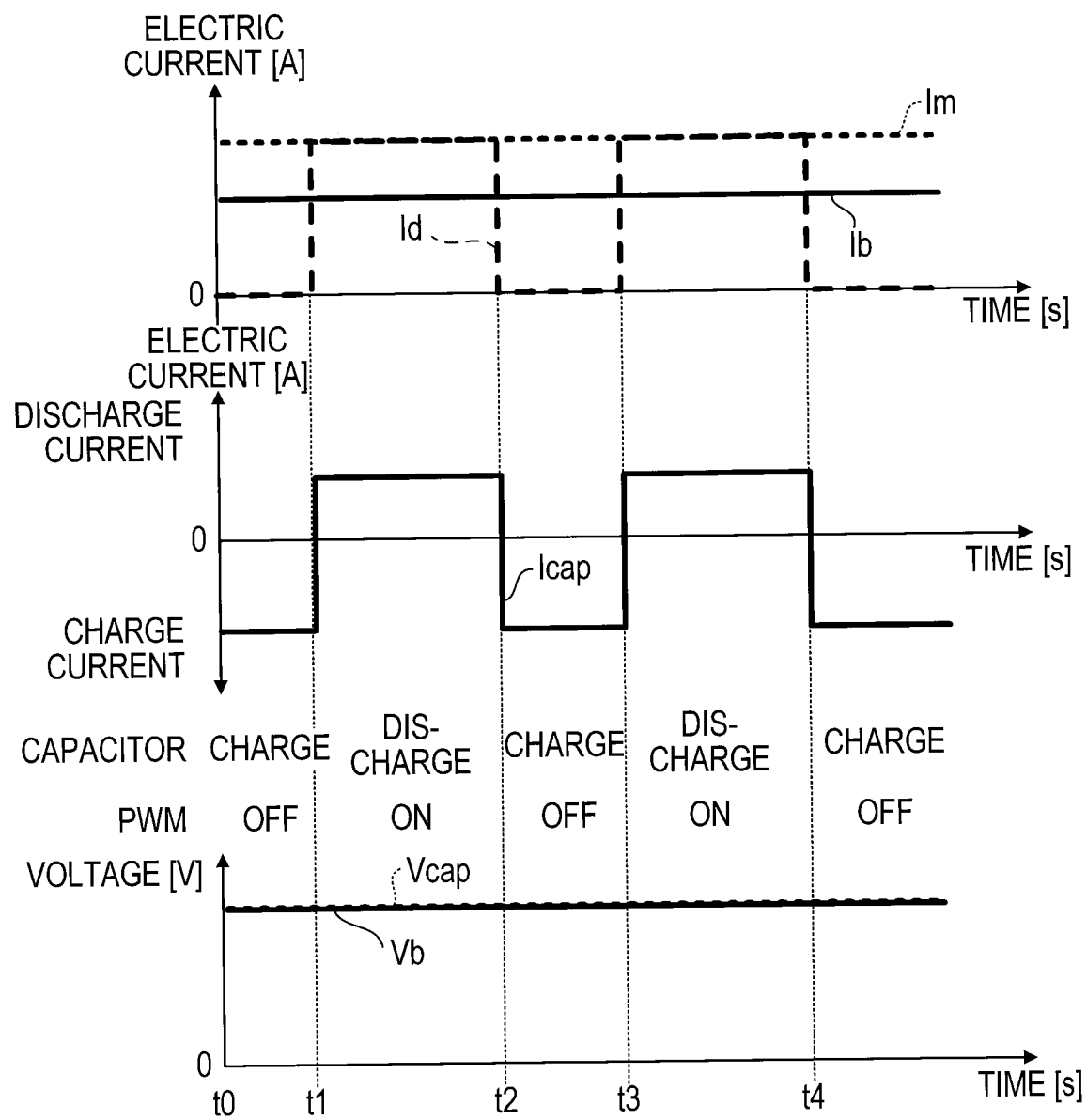
FIG. 7 is a diagram showing a time variation in different electric currents and different voltages of the second comparative example.

FIG. 7 is a diagram showing one example of a time variation in the motor current Im, the driver electric current Id, the battery current Ib, the capacitor current Icap, the power-supply terminal voltage Vb, and the capacitor voltage Vcap while the PWM control is performed in the electric powered work machine 111 in the second comparative example.

Regardless of the PWM-OFF operation or the PWM-ON operation, the battery current Ib is maintained at a constant electric current value, which is smaller than the motor current Im.

The capacitor current Icap is maintained at a constant charging current value in the PWM-OFF time-period, and maintained at a constant discharging current value in the PWM-ON time-period.

Regardless of the PWM-OFF operation or the PWM-ON operation, the power-supply terminal voltage Vb and the capacitor voltage Vcap are maintained at constant voltage values.

In the electric powered work machine 111 in the second comparative example, the first capacitor C11 includes the two large capacitors C11a and C11b interconnected in parallel. This configuration decreases an ESR of the first capacitor C11. Additionally, the ripple current flowing through each of the capacitors C11a and C11b is decreased. Further, a volume of the first capacitor C11 (specifically, a heat radiation or dissipation area) is increased. For those reasons, a low temperature of the first capacitor C11 (specifically, decrease in the heat generation) can be achieved. However, the first capacitor C11 is large, and thus, a storage manner to store the first capacitor C11 needs to be improved.

An electric powered work machine in the third comparative example will be described with reference to FIG. 8. The electric powered work machine in the third comparative example is basically similar to the electric powered work machine 101 of the first comparative example shown in FIG. 4. However, the capacitance of the first capacitor C10 in the third comparative example is smaller than the capacitance in the first comparative example (e.g., several hundreds µF). The capacitance of the first capacitor C10 in the third comparative example is further smaller than the capacitance in the first embodiment (e.g., 100 µF).

The capacitance of the first capacitor C10 in the third comparative example is 10 µF or less, for example.

Figure 8:
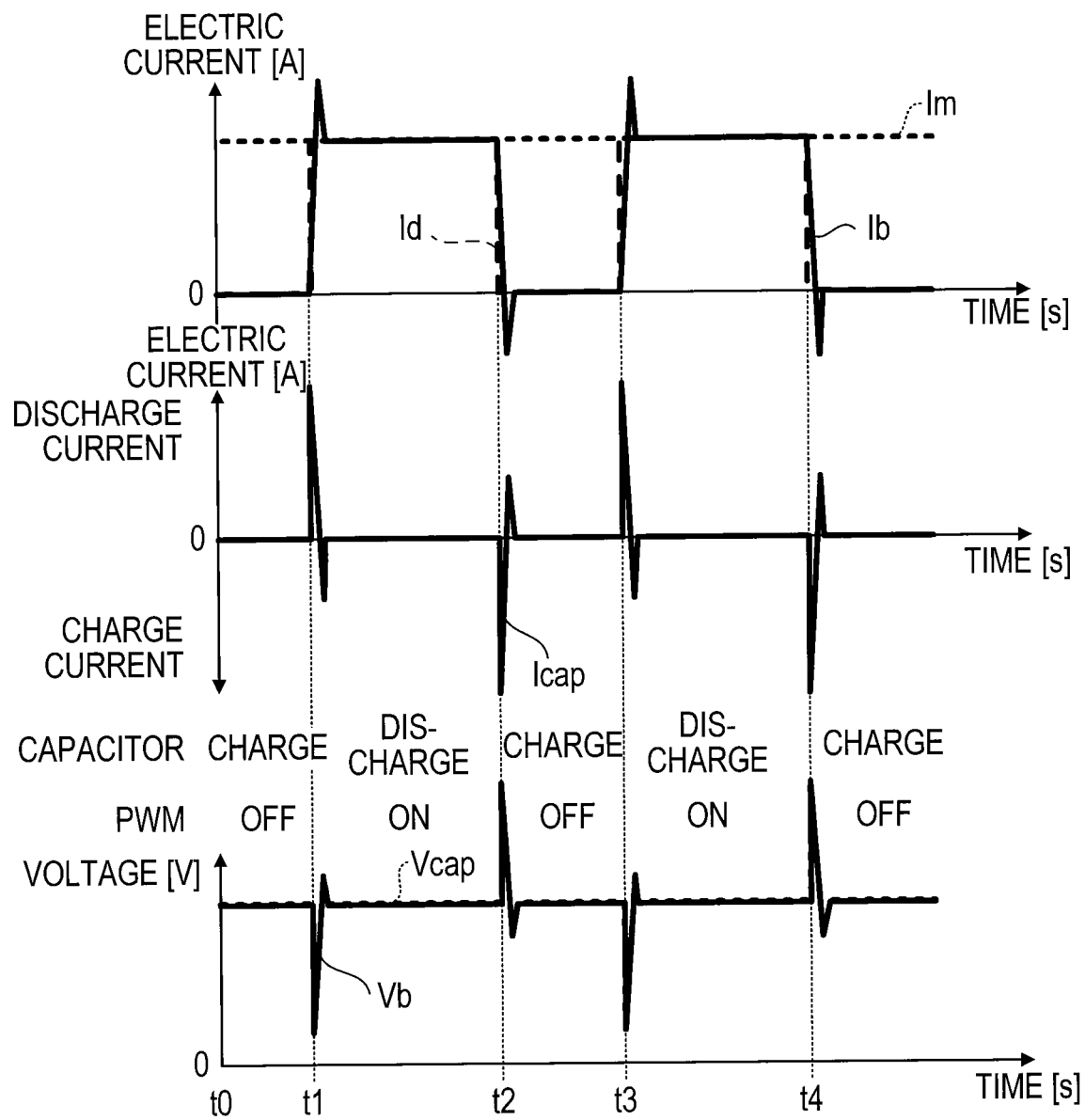
FIG. 8 a diagram showing a time variation in different electric currents and different voltages of a third comparative example.

FIG. 8 is a diagram showing one example of a time variation in the motor current Im, the driver electric current Id, the battery current Ib, the capacitor current leap, the power-supply terminal voltage Vb and the capacitor voltage Vcap while the PWM control is performed in the electric powered work machine in the third comparative example.

When the PWM-driving is switched from the PWM-OFF operation to the PWM-ON operation at time t1 and time t3, the battery current Ib rapidly increases from 0 A to exceed the motor current Im. After rapidly increasing, the battery current Ib quickly converges to the same value as that of the motor current Im.

At the instant when the PWM-driving is switched from the PWM-OFF operation to the PWM-ON operation, the same (or almost the same) magnitude of the capacitor current Icap (herein, discharging current) as that of the motor current Im flows through the first capacitor C10. However, this discharging current converges to 0 A. The reason of such a rapid decrease in the discharging current of the first capacitor C10 is because an amount of electric charge stored in the first capacitor C10 is small. Further, owing to the rapid decrease, the capacitor current Icap is temporarily switched to charging current. However, this charging current rapidly decreases after reaching its peak. As described above, the capacitor current Icap converges to 0 A. The reason of such change in the capacitor current leap is because current resonance occurs between the battery inductance Lb and the first capacitor C10.

At the instant when the PWM-driving is switched from the PWM-OFF operation to the PWM-ON operation at time t1 and time t3, the power-supply terminal voltage Vb and the capacitor voltage Vcap rapidly decrease. When decrease in the power-supply terminal voltage Vb and the capacitor voltage Vcap is stopped, the power-supply terminal voltage Vb and the capacitor voltage Vcap rapidly increase, and each exceeds the constant voltage value that is a value just before the PWM-OFF operation is switched to the PWM-ON operation. After the power-supply terminal voltage Vb and the capacitor voltage Vcap each exceed the constant voltage value, their increases are stopped. After that, the power-supply terminal voltage Vb and the capacitor voltage Vcap converge to the constant voltage value.

At the moment when the PWM-driving is switched from the PWM-OFF operation to the PWM-ON operation, the electric current is not supplied from the battery pack 10 owing to the battery inductance Lb. On the other hand, in order to avoid changes in the motor current Im, the first capacitor C10 supplies the electric current to compensate for deficiency of the electric current (specifically, the electric current that are not supplied from the battery pack 10) to the motor 11. However, the capacitance of the first capacitor C10 is so small that the capacitor voltage Vcap rapidly decreases. It is noted that the first capacitor C10 continues to supply the electric current until the capacitor voltage Vcap reaches 0V. In a case where the electric current is still not supplied from the battery pack 10 after the capacitor voltage Vcap reaches 0V, then the motor current Im is to be in a flyback mode in the motor driver 21. Thus, the value of the motor current Im remains unchanged. When the electric current is supplied from the battery pack 10 after the capacitor voltage Vcap reaches 0V, the first capacitor C10 is charged to reach the power-supply terminal voltage Vb.

When the PWM-driving is switched from the PWM-ON operation to the PWM-OFF operation at time t2 and time t4, the battery current Ib rapidly decreases to fall below 0 A. The battery current Ib that has fallen below 0 A reaches its peak, and converges to 0 A thereafter. As described above, the battery current Ib falls below 0 A, and then its value returns to 0 A. The reason of such return is because current resonance occurs between the battery inductance Lb and the first capacitor C10.

At the instant when the PWM-driving is switched to the PWM-OFF operation, the same (or almost the same) magnitude of the capacitor current Icap (herein, charging current) as that of the motor current Im flows through the first capacitor C10. However, this charging current rapidly decreases, and is changed to discharging current. This discharging current reaches its peak, and then rapidly decreases, converging to 0 A thereafter. As described above, the capacitor current Icap exceeds 0 A, and then it returns to 0 A. The reason of such return is because current resonance occurs between the battery inductance Lb and the first capacitor C10.

When the PWM-driving is switched from the PWM-ON operation to the PWM-OFF operation at time t2 and time t4, the power-supply terminal voltage Vb and the capacitor voltage Vcap rapidly increase. When increase in the power-supply terminal voltage Vb and the capacitor voltage Vcap is stopped, the power-supply terminal voltage Vb and the capacitor voltage Vcap rapidly decrease, and each falls below the constant voltage value that is before the PWM-ON operation is switched to the PWM-OFF operation. The power-supply terminal voltage Vb and the capacitor voltage Vcap are stopped to decrease after falling below the constant voltage value, then converging to the constant voltage value. An energy transfer time (specifically, a time when the battery current Ib decreases) is short, in which energy is transferred from the battery inductance Lb to the first capacitor C10 when the PWM-ON operation is switched to the PWM-OFF operation. Accordingly, the short energy transfer time causes a high surge voltage.

In the third comparative example, the capacitance of the first capacitor C10 is so small that ripple current can be decreased (in other words, heat generation can be decreased). However, simultaneously with the PWM-ON operation, the driver electric current Id (specifically, discharging current) flows from the first capacitor C10 to the motor driver 21. Accordingly, a voltage of the first capacitor C10 rapidly decreases. On the other hand, after the PWM-ON operation starts, the battery current Ib rises after a time constant delay. The first capacitor C10 thus rapidly decreases, and is charged by the battery 12 thereafter.

In the electric powered work machine 1 in the first embodiment (see FIG. 1 to FIG. 3), discharge of the first capacitor C1 is reduced by the first diode D1. Discharging current is inhibited from flowing through the first capacitor C1, and thus the capacitor voltage Vcap tends not to be lower than the power-supply terminal voltage Vb. This also inhibits the first capacitor C1 from being charged by the battery 12. Consequently, without increasing the capacitance of the first capacitor C1, it is possible to reduce heat generation in the first capacitor C1 caused by the ripple current flowing through the first capacitor C1.

The first circuit 28 includes the resistor R1. This provides a releasing path disposed in the electric powered work machine 1 for discharging surge energy absorbed by the first capacitor C1. Further, the discharging current from the first capacitor C1 can be controlled. That is, the resistor R1 may serve as a releasing path. Moreover, the discharge from the first capacitor C1 is limited with the resistor R1, thereby enabling the capacitor voltage Vcap to be higher than a voltage of the battery 12. Accordingly, the first capacitor C1 can avoid being charged by anything other than a surge.

In the electric powered work machine 1, the cutoff frequency of the circuit including both the first capacitor C1 and the resistor R1 is higher than the PWM frequency. This enables the electric powered work machine 1 to complete the discharge of the first capacitor C1 within one period of PWM control.

The power-supply line 24 corresponds to one example of a first line according to the present disclosure. The ground line 25 corresponds to one example of a second line according to the present disclosure. The connecting line 26 corresponds to one example of a third line according to the present disclosure.

Second Embodiment

An electric powered work machine 40 in a second embodiment will be described with reference to FIG. 9 and FIG. 10. It is noted that configurations in common to the first embodiment are assigned identical reference numerals in FIG. 9 and FIG. 10. In the second embodiment, only portions that differ from those in the first embodiment will be explained.

Figure 9:
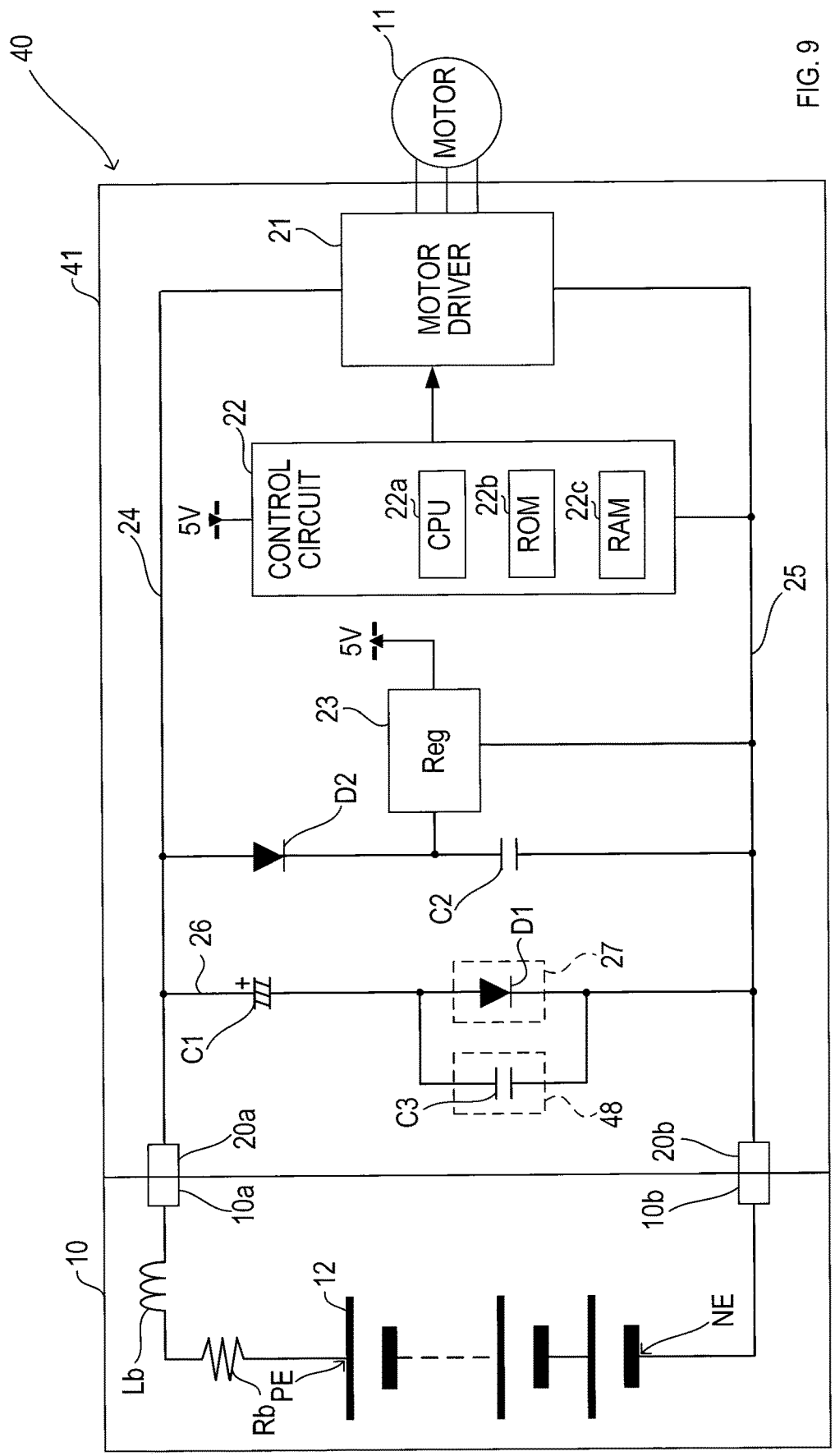
FIG. 9 a block diagram showing an electrical configuration of an electric powered work machine of a second embodiment.

As shown in FIG. 9, the electric powered work machine 40 in the second embodiment includes a first circuit 48 disposed in a controller 41. The first circuit 48 has a different configuration from that of the first circuit 28 in the first embodiment. Specifically, the first circuit 28 in the first embodiment includes the resistor R1, whereas the first circuit 48 in the second embodiment includes a second capacitor C3.

The second capacitor C3 is connected in parallel relative to the first diode D1. The capacitance of the second capacitor C3 is smaller than the capacitance of the first capacitor C1. The capacitance of the second capacitor C3 corresponds to one example of the second capacitance according to the present disclosure.

In one example, it is assumed that, simultaneously with the start of the PWM-ON operation, the electric current flows from the first capacitor C1 to the motor driver 21 is 100 A, the battery inductance Lb is 1 µH, the resistance Rb of the battery 12 is 0.1Ω, a time of instantaneous interruption of the battery 12 is 1 µs, a voltage drop generated in a combined capacitor due to an instantaneous interruption of the battery 12 is 10V. The combined capacitor indicates a capacitor equivalent to a capacitor including the first capacitor C1 and the second capacitor C3 interconnected in series. In this case, an capacitance of the combined capacitor is 10 µF, as shown in formula (2). Accordingly, when a total capacitance of the first capacitor C1 and the second capacitor C3 is 10 µF, it is possible to keep a voltage drop of the combined capacitor generated due to 1 µs of the instantaneous interruption to be 10V or less.

$$Q = C \times \Delta V \quad (2)$$
$$100\ [A] \times 1\ [\mu s] = C\ [F] \times 10 [V]$$
$$C = 10\ [\mu F]$$

Figure 10:
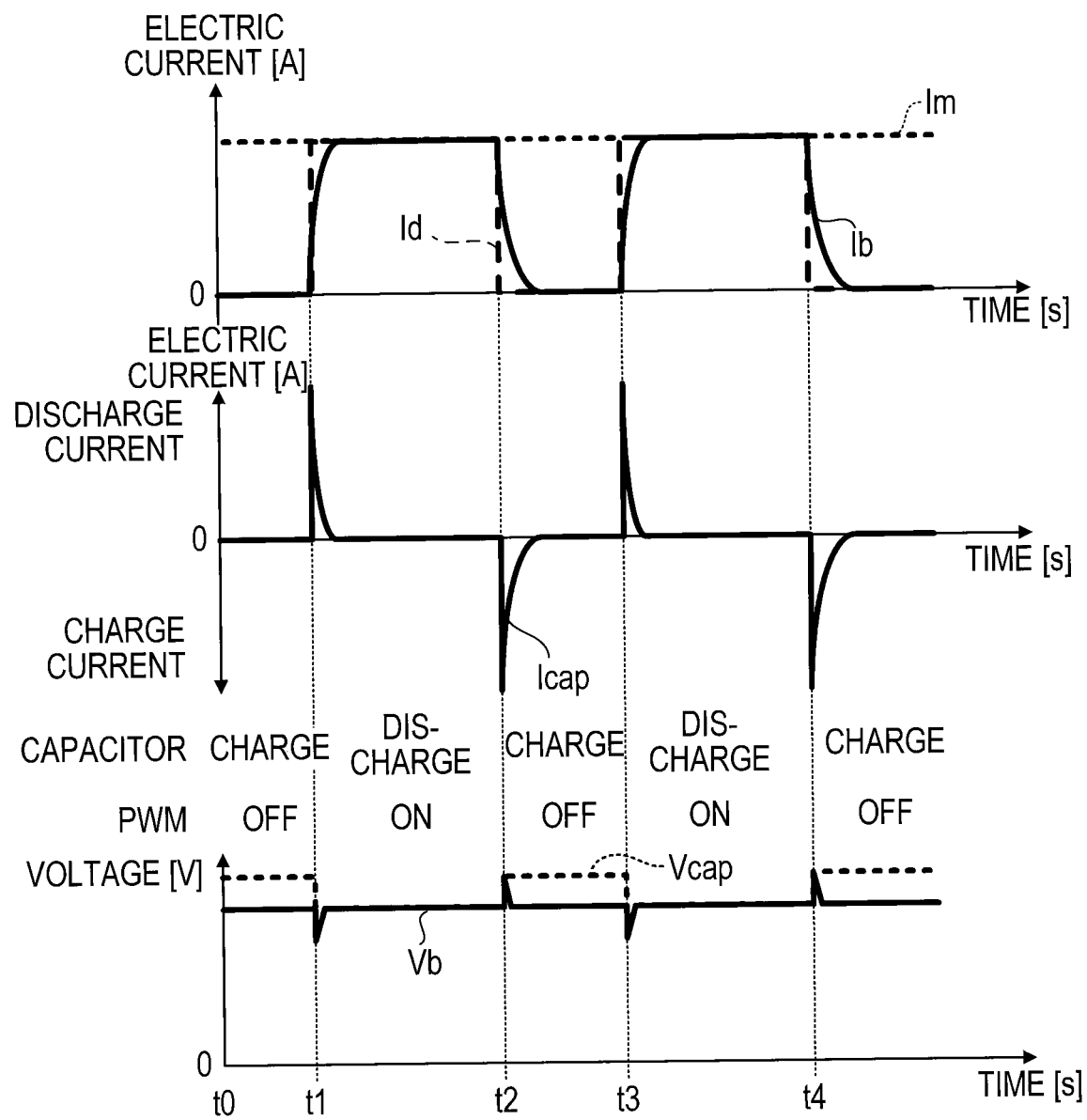
FIG. 10 is a diagram showing a time variation in different electric currents and different voltages of the second embodiment.

FIG. 10 is a diagram showing one example of a time variation in the motor current Im, the driver electric current Id, the battery current Ib, the capacitor current Icap, the power-supply terminal voltage Vb, and the capacitor voltage Vcap while the PWM control is performed in the electric powered work machine 40 in the second embodiment.

As shown in FIG. 10, when the PWM-driving is switched from the PWM-OFF operation to the PWM-ON operation at time t1 and time t3, the battery current Ib increases from 0 A. It is noted that the rising time of the battery current Ib is longer than that of the driver electric current Id.

At the instant when the PWM-driving is switched from the PWM-OFF operation to the PWM-ON operation at time t1 and time t3, the same (or almost the same) magnitude of the capacitor current Icap (herein, discharging current) as that of the motor current Im flows through the first capacitor C1. However, this discharging current quickly converges to 0 A.

When the PWM-driving is switched from the PWM-OFF operation to the PWM-ON operation at time t1 and time t3, the power-supply terminal voltage Vb and the capacitor voltage Vcap instantaneously drop. However, after this drop, values of the power-supply terminal voltage Vb and the capacitor voltage Vcap converge to the constant voltage value (specifically, a value of the power-supply terminal voltage Vb before the PWM-driving is switched to the PWM-ON operation). As such, the combined capacitor discharges the electric current simultaneously with the start of the PWM-ON operation, and then the capacitor voltage Vcap decreases. It is noted that a rush current flows to the motor driver 21 during the PWM-ON operation. The rush current is supplied from the combined capacitor. Thus, the capacitor voltage Vcap does not drop largely, which does not lead to an instantaneous interruption.

When the PWM-driving is switched from the PWM-ON operation to the PWM-OFF operation at time t2 and time t4, the battery current Ib decreases to 0 A. However, the falling time of the battery current Ib is longer than the falling time of the driver electric current Id.

At the instant when the PWM-driving is switched from the PWM-ON operation to the PWM-OFF operation at time t2 and time t4, the same (or almost the same) magnitude of the capacitor current Icap (herein, charging current) as that of the motor current Im flows through the first capacitor C1. However, this charging current converges to 0 A.

When the PWM-driving is switched from the PWM-ON operation to the PWM-OFF operation at time t2 and time t4, the power-supply terminal voltage Vb and the capacitor voltage Vcap instantaneously increase. After the power-supply terminal voltage Vb instantaneously increases, the power-supply terminal voltage Vb rapidly converges and returns to the constant voltage value that is before its increase.

After the capacitor voltage Vcap instantaneously increases, the increased voltage value is maintained while the PWM-OFF operation is performed.

A surge voltage that occurs simultaneously with the PWM-OFF operation is absorbed by the first capacitor C1. Absorption of the surge voltage by the first capacitor C1 causes the capacitor voltage Vcap to be higher than the power-supply terminal voltage Vb. Thus, the first capacitor C1 is not charged by the battery 12, in at least an example shown in FIG. 10.

The electric powered work machine 40 in the second embodiment obtains the same effects from the first diode D1 as those of the first embodiment.

In the second embodiment, the first circuit 48 includes the second capacitor C3. The electric powered work machine 40 thus can reduce the time of instantaneous interruption of the battery 12 at the switching of the PWM-driving from the PWM-OFF operation to the PWM-ON operation.

Third Embodiment

An electric powered work machine 50 in a third embodiment will be described with reference to FIG. 11 to FIG. 16. It is noted that configurations in common to the first embodiment are assigned identical reference numerals in FIG. 11 and FIG. 16. In the third embodiment, only portions that differ from those in the first embodiment will be explained.

Figure 11:
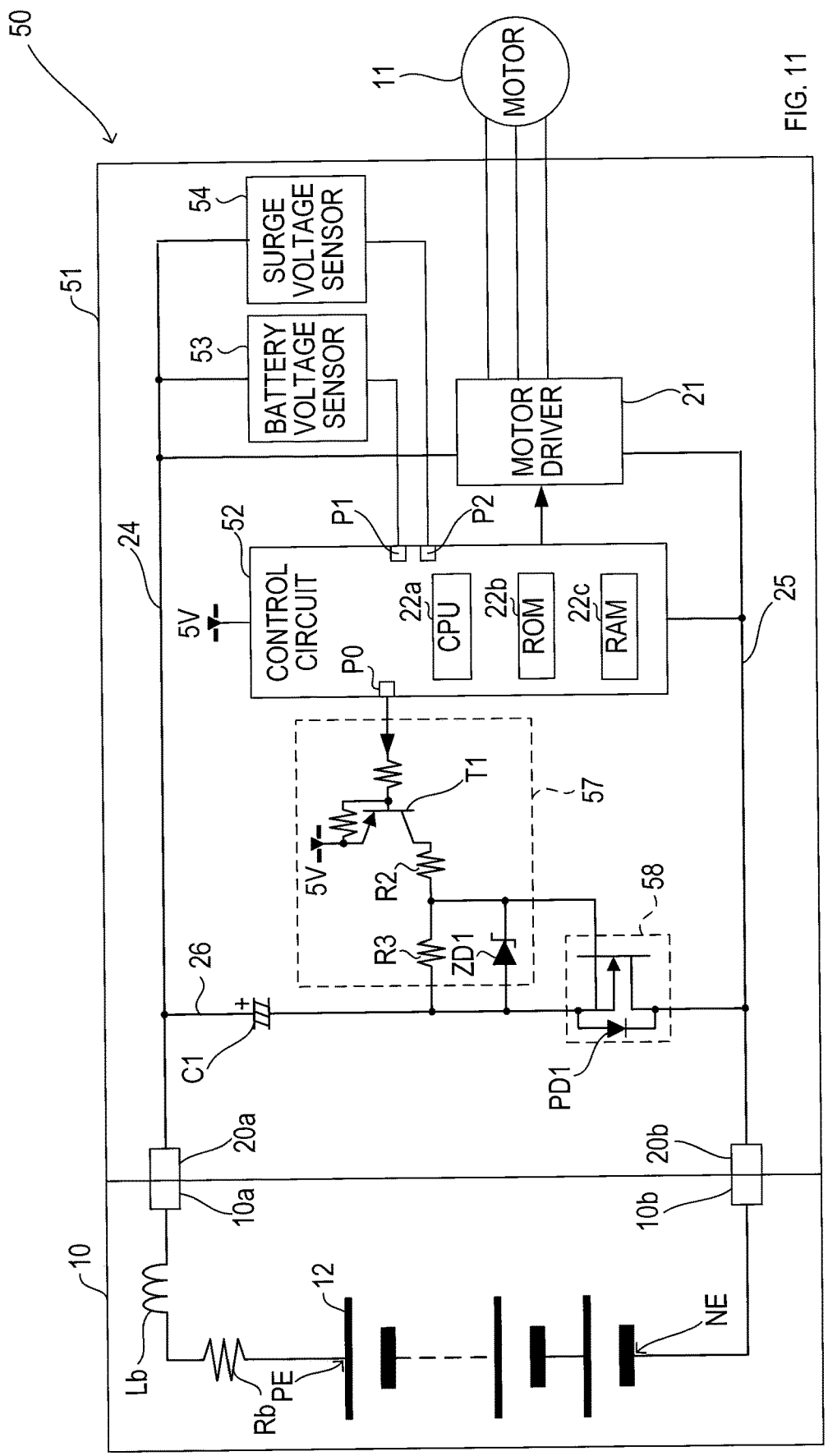
FIG. 11 is a block diagram showing an electrical configuration of an electric powered work machine of a third embodiment.

As shown in FIG. 11, the electric powered work machine 50 in the third embodiment includes a controller 51, which has a different configuration from that of the controller 20 in the first embodiment. Specifically, in place of the first diode D1 and the resistor R1, a field effect transistor (hereinafter, simply referred to as "FET") 58 is disposed on the connecting line 26. The controller 51 includes a switching circuit 57. The switching circuit 57 turns ON and OFF the FET 58. Further, the controller 51 includes a battery voltage sensor 53, a surge voltage sensor 54, and a control circuit 52. The control circuit 52 basically has the same function as that of the control circuit 22 in the first embodiment. The control circuit 52 includes a first input port (or a battery voltage read port) P1, a second input port (or a surge voltage read port) P2, and an output port P0. The control circuit 52 executes a PWM timer interruption process, a first timer interruption process, a first check process, and a second check process, which are be described below.

The switching circuit 57 includes a first transistor T1, a resistor R2, a resistor R3, and a Zener diode ZD1. The FET 58 is in the form of, for example, an N-Channel FET. The FET 58 includes a parasitic diode PD1. The first transistor T1 is in the form of, for example, a PNP transistor.

A base of the first transistor T1 is connected to the output port P0 of the control circuit 52. A voltage (e.g., 5V) generated, for example, at the regulator 23 (not shown in FIG. 11) is applied to an emitter of the first transistor T1. A collector of the first transistor T1 is connected to a first end of the resistor R2.

A second end of the resistor R2 is connected to a first end of the resistor R3, a cathode of the Zener diode ZD1, and a gate of the FET 58.

A second end of the resistor R3 is connected to a second end of a first capacitor C1. A source of the FET 58 is connected to the second end of the first capacitor C1, the second end of the resistor R3, and an anode of the Zener diode ZD1. A drain of the FET 58 is connected to the ground line 25.

When a voltage of the output port P0 is set to a low level, the first transistor T1 is turned on. A high level of voltage is thus applied to the gate of the FET 58, and the FET 58 is turned on. At the source of the FET 58, a negative voltage may occur. Thus, the output port P0 of the control circuit 52 is not directly connected to the gate of the FET 58, but is connected to the gate of the FET 58 via the first transistor T1.

The battery voltage sensor 53 detects a voltage of the battery 12 (that is, a battery voltage). The battery voltage sensor 53 outputs a first detection signal to the first input port P1. The first detection signal has a voltage value in accordance with a magnitude of the battery voltage.

The surge voltage sensor 54 detects a surge voltage that occurs between the first power-supply terminal 20a and the first ground terminal 20b. The surge voltage sensor 54 includes, for example, a peak hold circuit (or a peak detector) (not shown). The peak hold circuit holds a peak value of a voltage across the first power-supply terminal 20a and the first ground terminal 20b, for example. The peak hold circuit includes, for example, a diode. The maximum value of a voltage drop caused by this diode is, for example, 1V. The surge voltage sensor 54 outputs a second detection signal to the second input port P2. The second detection signal has a voltage value in accordance with a magnitude of the detected surge voltage.

Figure 12:
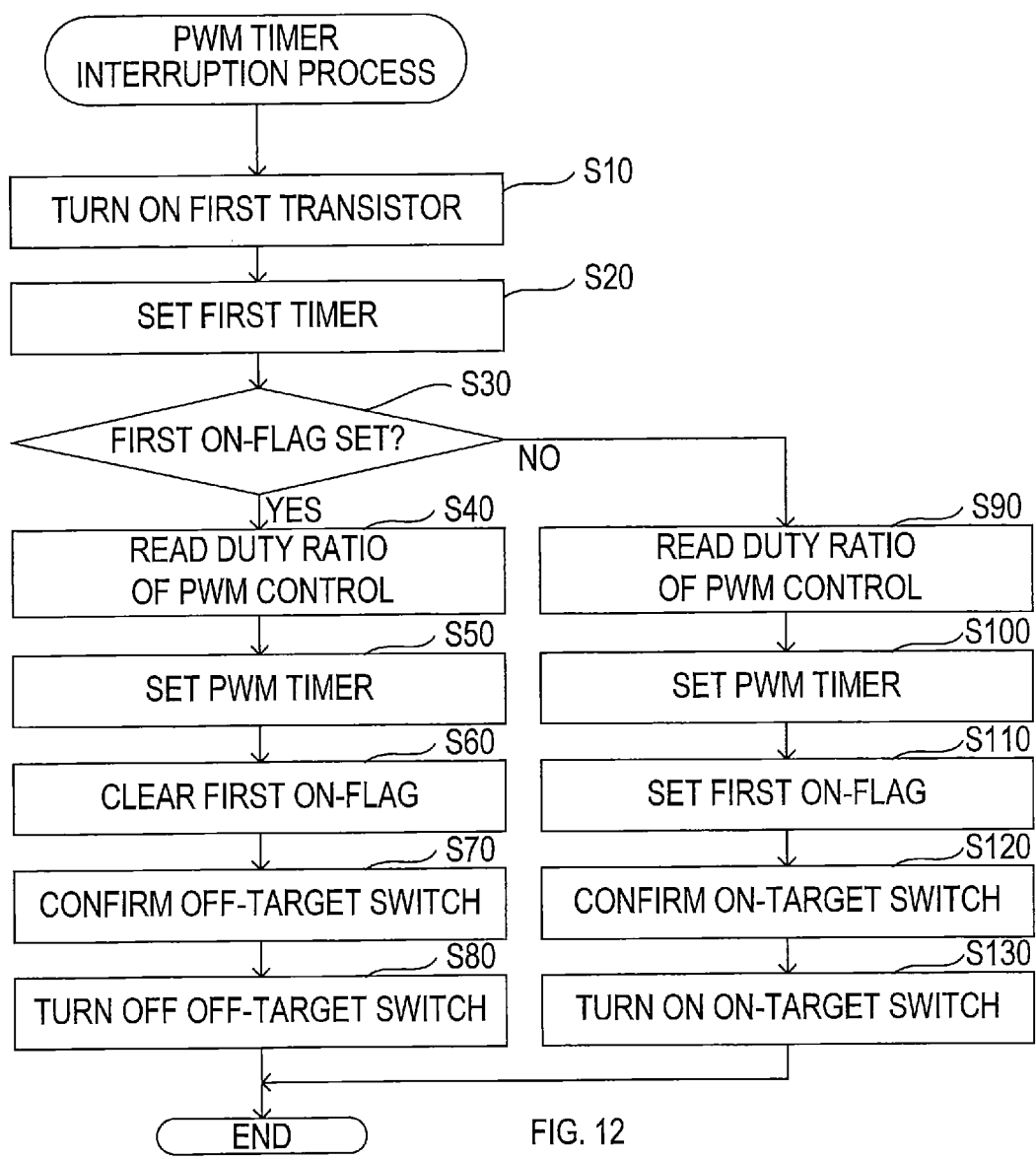
FIG. 12 is a flowchart showing a PWM timer interruption process.

A CPU 22a of the control circuit 52 executes the PWM timer interruption process shown in FIG. 12. The PWM timer interruption process is executed after an elapse of the time (specifically, an OFF-operation time or an ON-operation time) that is set in a PWM timer described below.

The CPU 22a starts the PWM timer interruption process to turn on the FET 58 in S10. In S20, the CPU 22a sets a first ON time in a first timer. The first timer produces a first timer interruption. The first ON time may be set in advance. The first ON time is set in the first timer in S20, and after the first ON time elapses, the first timer interruption occurs. Occurrence of the first timer interruption causes the first timer interruption process shown in FIG. 13, which will be described below, to be executed.

In S30, the CPU 22a determines whether a first ON-flag provided in the RAM 22c is set. The term "SET FLAG" is intended to mean that, for example, a value of the flag is set to 1. The term "CLEAR FLAG" is intended to mean that, for example, a value of the flag is set to 0.

If the first ON-flag is set in S30, then the present process proceeds to S40. In S40, the CPU 22a reads from the RAM 22c a duty ratio at the present time in the PWM control. In S50, the CPU 22a calculates the OFF-operation time based on the duty ratio that is read. Further, the CPU 22a sets the calculated OFF-operation time in the PWM timer. The OFF-operation time is set in the PWM timer in S50, and after the OFF-operation time elapses, the PWM timer interruption occurs again.

In S60, the CPU 22a clears the first ON-flag. In S70, the CPU 22a confirms a drive switch that needs to be switched from the PWM-ON operation to the PWM-OFF operation in the motor driver 21 (hereinafter, referred to as an "OFF-target switch").

In S80, the CPU 22a turns off the OFF-target switch, and terminates the PWM timer interruption process.

If the first ON-flag is cleared in S30, then present process proceeds to S90. In S90, the CPU 22a reads from the RAM 22c a duty ratio at the present time in the PWM control. In S100, the CPU 22a calculates the ON-operation time based on the duty ratio that is read. Further, the CPU 22a sets the calculated ON-operation time in the PWM timer. The ON-operation time is set in the PWM timer in S100, and after the ON-operation time elapses, the PWM timer interruption occurs again.

The CPU 22a sets the first ON-flag in S110. In S120, the CPU 22a confirms a drive switch that needs to be switched from the PWM-OFF operation to the PWM-ON operation in the motor driver 21 (hereinafter, referred to as an "ON-target switch").

In S130, the CPU 22a turns on ON-target switch, and terminates the PWM timer interruption process.

Figure 13:
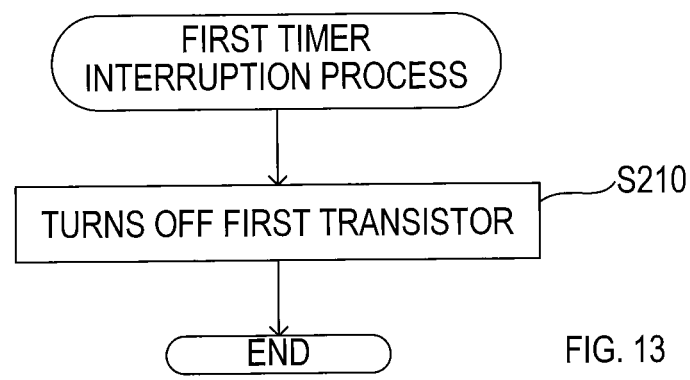
FIG. 13 is a flowchart showing a first timer interruption process.

Next, the CPU 22a executes the first timer interruption process shown in FIG. 13. As described above, the first timer interruption process is executed when the first timer interruption occurs.

When starting the first timer interruption process, the CPU 22a turns off the FET 58 in S210. After executing the process in S210, the CPU 22a terminates the first timer interruption process.

Figure 14:
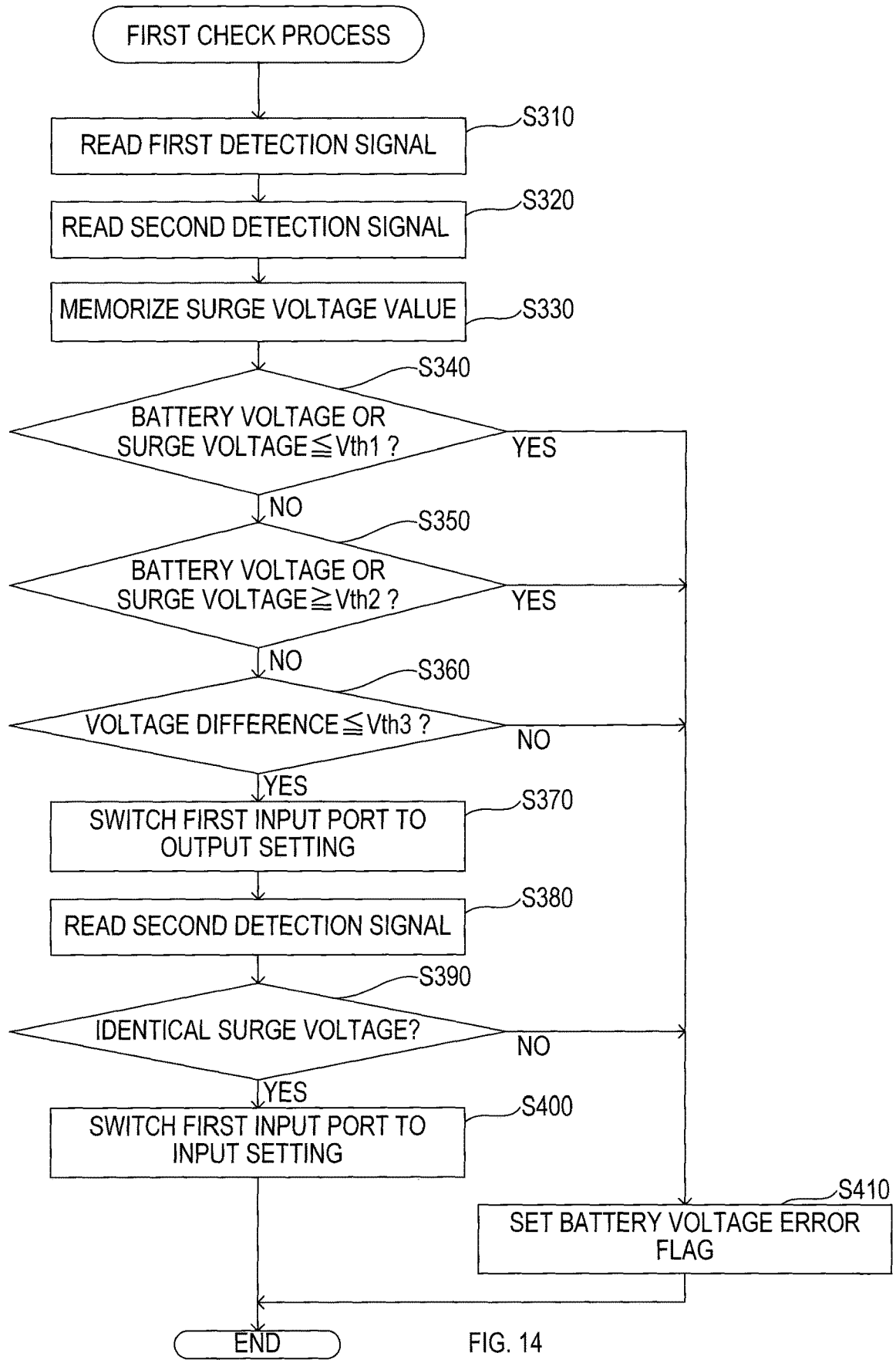
FIG. 14 is a flowchart showing a first check process.

The CPU 22a executes the first check process shown in FIG. 14. The first check process includes checking the battery voltage. The first check process is repeatedly executed while the drive of the motor 11 is stopped.

The CPU 22a starts the first check process, and in S310 read the first detection signal that is input in the first input port P1. In S320, the CPU 22a reads the second detection signal that is input in the second input port P2.

In S330, the CPU 22a calculates a value of the surge voltage (hereinafter, referred to as a "surge voltage value") based on a voltage of the second detection signal that is read in S320. In S330, the CPU 22a stores the calculated surge voltage value in the RAM 22c.

In S340, the CPU 22a calculates a value of the battery voltage (hereinafter, referred to as a "battery voltage value") based on the voltage of the first detection signal that is read in S310. The CPU 22a then determines whether this calculated battery voltage value or the surge voltage value calculated in S330 is a first threshold Vth1 or less. In other words, the CPU 22a executes a ground fault check in S340. The first threshold Vth1 is, for example, a voltage value of which the battery 12 cannot normally have. The first threshold Vth1 may be 0.5V, for example.

If the battery voltage value or the surge voltage value is the first threshold Vth1 or less in S340, then the present process proceeds to S410. On the other hand, if the battery voltage value and the surge voltage value exceeds the first threshold Vth1, the present process proceeds to S350. In S350, the CPU 22a determines whether the battery voltage value or the surge voltage value is the second threshold Vth2 or greater. In other words, the CPU 22a executes a power supply fault check in S350. The second threshold Vth2 is, for example, a voltage value of which the battery 12 cannot normally have. The second threshold Vth2 may be 4.5V, for example.

If the battery voltage value or the surge voltage value is the second threshold Vth2 or greater in S350, then the present process proceeds to S410. On the other hand, if the battery voltage value and the surge voltage value are less than the second threshold Vth2, then the present process proceeds to S360. In S360, the CPU 22a determines whether a difference between the battery voltage value and the surge voltage value (hereinafter, referred to as a "voltage difference") is a third threshold Vth3 or less. The third threshold Vth3 may be 1V, for example.

If the voltage difference exceeds the third threshold Vth3 in S360, the present process proceeds to S410. On the other hand, if the voltage difference is the third threshold Vth3 or less, the present process proceeds to S370. In S370, the CPU 22a switches the first input port P1 to an output setting.

Setting the first input port P1 to the output setting includes setting a voltage of the first input port P1 to a high level (e.g., 5V).

In S380, the CPU 22a reads a second detection signal that is input in the second input port P2. In S390, the CPU 22a calculates a surge voltage value based on the voltage of the second detection signal that is read in S380. The CPU 22a then determines whether the calculated surge voltage value is identical to the surge voltage value that is stored in S330. That is, the CPU 22a checks short-circuit between the first input port P1 and the second input port P2 in S390.

If the calculated surge voltage value is determined to be identical in S390, the present process proceeds to S400. In S400, the CPU 22a switches the first input port P1 to the input setting (or an AD input setting). After the process in S400, the CPU 22a terminates the first check process. If the calculated surge voltage value is not determined to be identical in S390, the present process proceeds to S410.

In S410, the CPU 22a sets a battery voltage error flag provided in the RAM 22c. In other words, the CPU 22a determines that a failure occurs in the electric powered work machine 50. After the process in S410, the CPU 22a terminates the first check process.

Figure 15:
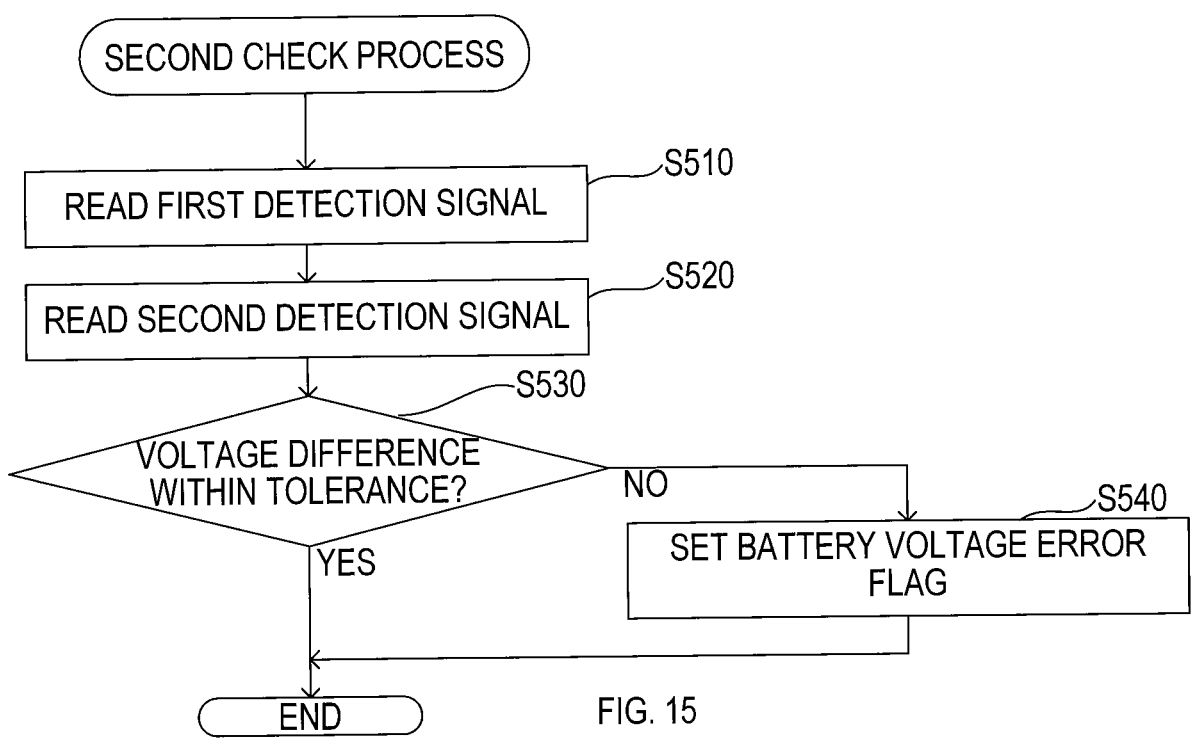
FIG. 15 is a flowchart showing a second check process.

The CPU 22a of the control circuit 52 executes a second check process shown in FIG. 15. The first check process includes checking of the battery voltage. The second check process is repeatedly executed while the motor 11 is driven.

The CPU 22a starts the second check process, and in S510 reads the first detection signal that is output from the battery voltage sensor 530. In S520, the CPU 22a reads the second detection signal that is output from the surge voltage sensor 54.

In S530, the CPU 22a calculates a battery voltage value based on the voltage of the first detection signal that is read in S510. Further, the CPU 22a calculates a surge voltage value based on the voltage of the second detection signal that is read in S520. The CPU 22a then determines whether a gap (specifically, the voltage difference) between the calculated battery voltage value and the surge voltage value is within a tolerance. The voltage difference determined there corresponds to a surge voltage that has been unable to be absorbed by the first capacitor C1. The tolerance may be set in advance. The tolerance corresponds to one example of the first range according to the present disclosure.

If the voltage difference is within the tolerance in S530, then the CPU 22a terminates the second check process. On the other hand, if the voltage difference is out of the tolerance, then present process proceeds to S540. In S540, the CPU 22a sets a battery voltage error flag. In other words, the CPU 22a determines that a failure occurs in the electric powered work machine 50. After the process in S540, the CPU 22a terminates the second check process.

Figure 16:
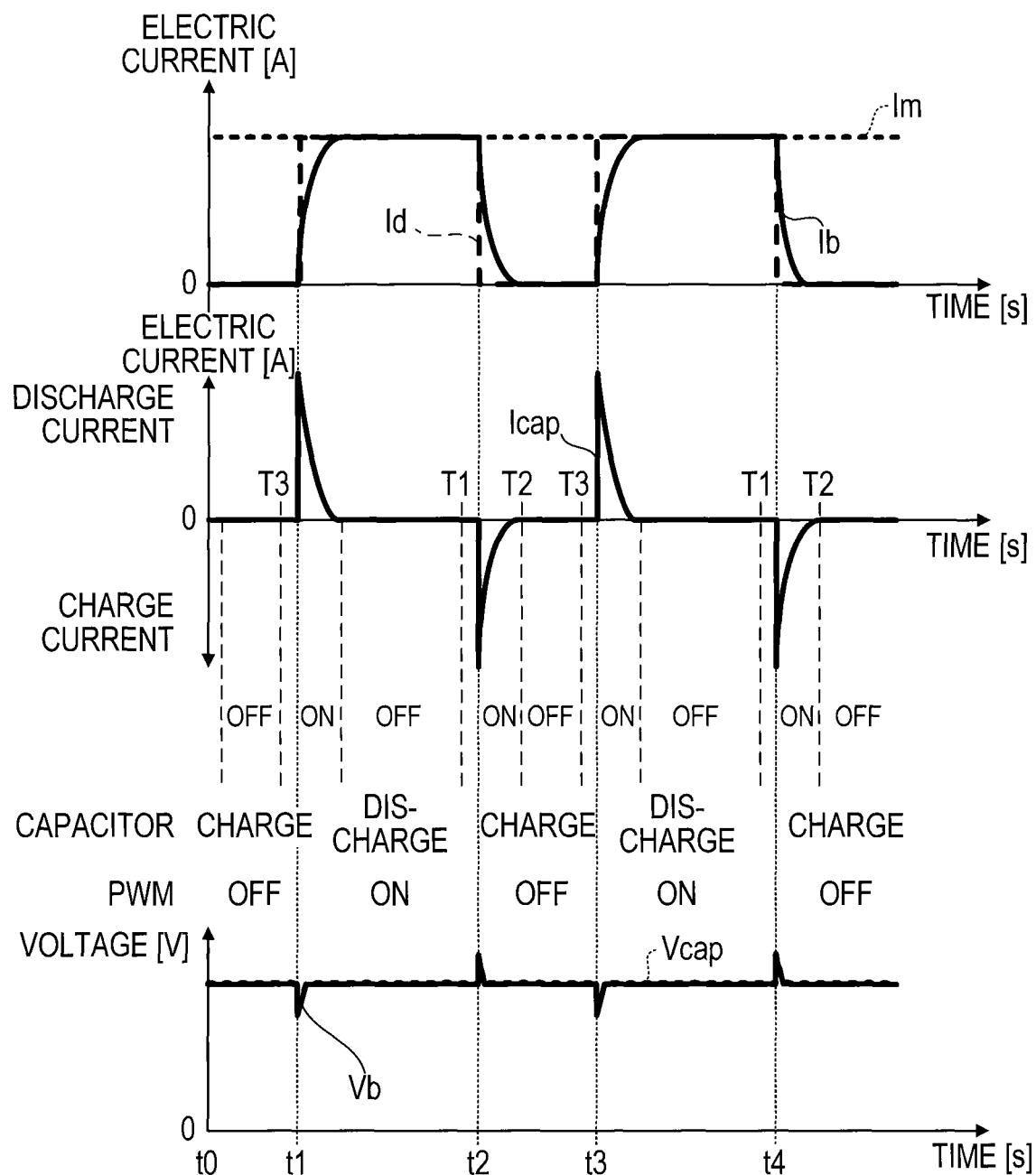
FIG. 16 is a diagram showing a time variation in different electric currents and different voltages of the third embodiment.

FIG. 16 is a diagram showing one example of a time variation in the motor current Im, the driver electric current Id, the battery current Ib, the capacitor current Icap, the power-supply terminal voltage Vb, and the capacitor voltage Vcap, while the PWM control is performed in the electric powered work machine 50 in the third embodiment.

As shown in FIG. 16, the FET 58 is turned on at a first timing T1. The first timing T1 is a time point earlier by a first time period than a point of time (e.g., time t2 or time t4) when the PWM-driving is switched to the PWM-OFF operation. The first timing T1 may be a time point later by a second time period than the point of time when the PWM-driving is switched to the PWM-OFF operation. The FET 58, which is turned on at the first timing T1, is turned off at the second timing T2 after the PWM-driving is switched to the PWM-OFF operation. The second timing T2 is a time point earlier by a third time period than a starting time when another PWM-ON operation starts.

Further, the FET 58 is turned on at a third timing T3. The third timing T3 is earlier by a fourth time period than a point of time (e.g., time t1 or time t3) when the PWM-driving is switched to the PWM-ON operation.

As shown in FIG. 16, when the PWM-driving is switched from the PWM-OFF operation to the PWM-ON operation at time t1 and time t3, the battery current Ib increases from 0 A. However, the rising time of the battery current Tb is longer than the rising time of the driver electric current Id.

At the instant when the PWM-driving is switched to the PWM-ON operation at time t1 and time t3, the same (or almost the same) magnitude of the capacitor current leap (herein, discharging current) as that of the motor current Im flows through the first capacitor C1. However, this discharging current rapidly converges to 0 A. It is noted that the FET 58 is turned on at the third timing T3 that is before the PWM-OFF operation is switched to the PWM-ON operation. This allows the first capacitor C1 to discharge the electric current, and thus the instantaneous interruption of battery pack 10 does not occur. The FET 58, which is ON at the third timing T3, is switched to OFF after the PWM-driving is switched to the PWM-ON operation. After the FET 58 is switched to OFF, the first capacitor C1 cannot discharge the electric current.

When the PWM-driving is switched from the PWM-OFF operation to the PWM-ON operation at time t1 and time t3, the power-supply terminal voltage Vb and the capacitor voltage Vcap instantaneously drop.

When the PWM-driving is switched from the PWM-ON operation to the PWM-OFF operation at time t2 and time t4, the battery current Ib decreases to 0 A. However, the falling time of the battery current Ib is longer than the falling time of the driver electric current Id.

At the instant when the PWM-driving is switched to the PWM-OFF operation at time t2 and time t4, the same (or almost the same) magnitude of the capacitor current Icap (herein, charging current) as that of the motor current Im flows through the first capacitor C1. However, this charging current rapidly converges to 0 A.

When the PWM-driving is switched from the PWM-ON operation to the PWM-OFF operation at time t2 and time t4, the power-supply terminal voltage Vb instantaneously increases. At this time, the FET 58 is ON. Accordingly, a surge current to occur simultaneously with the PWM-OFF operation does not flow into the parasitic diode PD1 in the FET 58. This avoids loss caused by the parasitic diode.

A surge generation time is 1 μs or less, which is a very short time. Thus, the FET 58 cannot be made OFF immediately after the first capacitor C1 absorbs surge energy. Consequently, the FET 58 remains ON. The surge energy absorbed by the first capacitor C1 is regenerated to the battery 12. The FET 58 is turned off after the surge occurs, and thereafter, the first capacitor C1 cannot discharge the electric current as long as the FET 58 is OFF.

In the third embodiment, the parasitic diode PD1 disposed in the FET 58 works as a rectifier. That is, the parasitic diode PD1 performs a function equivalent to that of, for example, the first diode D1 in the first embodiment. The FET 58 that is ON works as a first circuit. That is, the FET 58 that is ON performs a function equivalent to that of, for example, the resistor R1 in the first embodiment.

In the electric powered work machine 50, discharge of the first capacitor C1 is inhibited with the parasitic diode PD1. In other words, the discharging current is inhibited from flowing into the first capacitor C1. Consequently, without increasing the capacitance of the first capacitor C1, it is possible to reduce heat generation in the first capacitor C1 caused by the ripple current flowing through the first capacitor C1.

The control circuit 52 performs a switching control. The switching control includes switching the FET 58 from ON to OFF. The control circuit 52 turns on the FET 58 at the third timing T3 before the PWM-ON operation starts. After turning on the FET 58 at the third timing T3, the control circuit 52 turns off the FET 58. Therefore, in the electric powered work machine 50, a rush current, which flows toward the motor 11 through the power-supply line 24 during the PWM-ON operation, can be supplied from the first capacitor C1.

The control circuit 52 measures a battery voltage and a surge voltage while the drive of the motor 11 is sopped. If the surge voltage or the battery voltage is not less than the second threshold Vth2 or not greater than the first threshold Vth1, then the control circuit 52 determines that a failure occurs in the electric powered work machine 50. That is, the electric powered work machine 50 enables detection of a failure in the battery voltage sensor 53 and the surge voltage sensor 54 based on the surge voltage and the battery voltage.

The control circuit 52 measures the battery voltage and the surge voltage while the motor 11 is driven. If the voltage difference is out of the tolerance, the control circuit 52 determines that a failure occurs in the electric powered work machine 50. That is, based on the surge voltage and the battery voltage, the electric powered work machine 50 enables detection of a failure in the battery voltage sensor 53 and the surge voltage sensor 54, or a failure of the first capacitor C1.

The control circuit 52 sets the first input port P1 to a high level. If a voltage level of the first input port P1 is set to the high level and thereby a voltage of the second input port P2 is changed, then the control circuit 52 determines that a failure occurs in the electric powered work machine 50. That is, based on the surge voltage and the battery voltage, the electric powered work machine 50 enables detection of a short-circuit failure in each of the lines where the surge voltage and the battery voltage are measured.

In the third embodiment, the control circuit 52 corresponds to one example of the second control circuit according to the present disclosure.

S310 and S320 correspond to one example of a first measurement device according to the present disclosure. S340 and S350 corresponds to one example of a first processing according to the present disclosure, which is executed by a first processor.

S510 and S520 correspond to one example of a second measurement device according to the present disclosure. S530 corresponds to one example of a second processing according to the present disclosure, which is executed by a second processor.

S370 corresponds to one example of a level setter according to the present disclosure. S390 corresponds to one example of a third processing according to the present disclosure, which is executed by a third processor. The first input port P1 corresponds to one example of a target port according to the present disclosure, and the second input port P2 corresponds to one example of a non-target port according to the present disclosure.

While the embodiments of the present disclosure have been described so far, the present disclosure is not limited to the above-described embodiments and can be carried out in variously modified forms.

For example, in the third embodiment, the FET 58 is turned on at the third timing T3 before the PWM-ON operation starts. However, the third timing T3 may be a time point before the PWM-ON operation starts. In other words, the FET 58 may be turned on simultaneously with the start of the PWM-ON operation.

Further, in the third embodiment, the FET 58 is turned on before the PWM-OFF operation starts at the first timing T1, and then the FET 58 is turned off at the second timing T2 after the PWM-OFF operation starts. However, the first timing T1 may be immediately before or after the PWM-OFF operation starts. In other words, the FET 58 may be turned on immediately before the PWM-OFF operation starts or immediately after the PWM-OFF operation starts. The FET 58 may be turned on before another PWM-ON operation starts. In this case, the electric powered work machine 50 allows the parasitic diode PD1 to be short-circuited while a surge occurs. This enables reduction in heat generation in the parasitic diode PD1 caused by a surge current.

Figure 17:
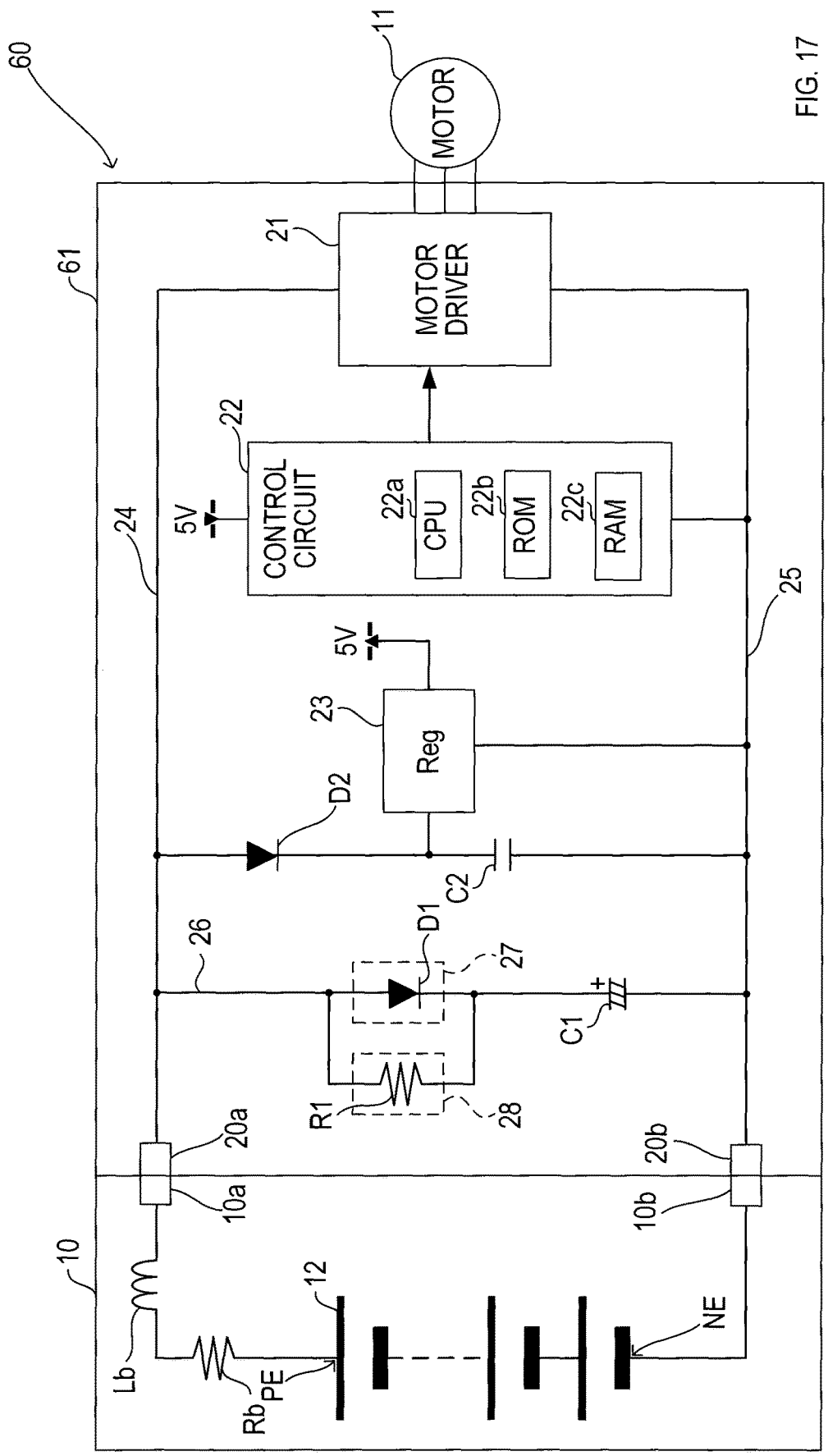
FIG. 17 is a block diagram showing an electrical configuration of another embodiment.
Figure 18:
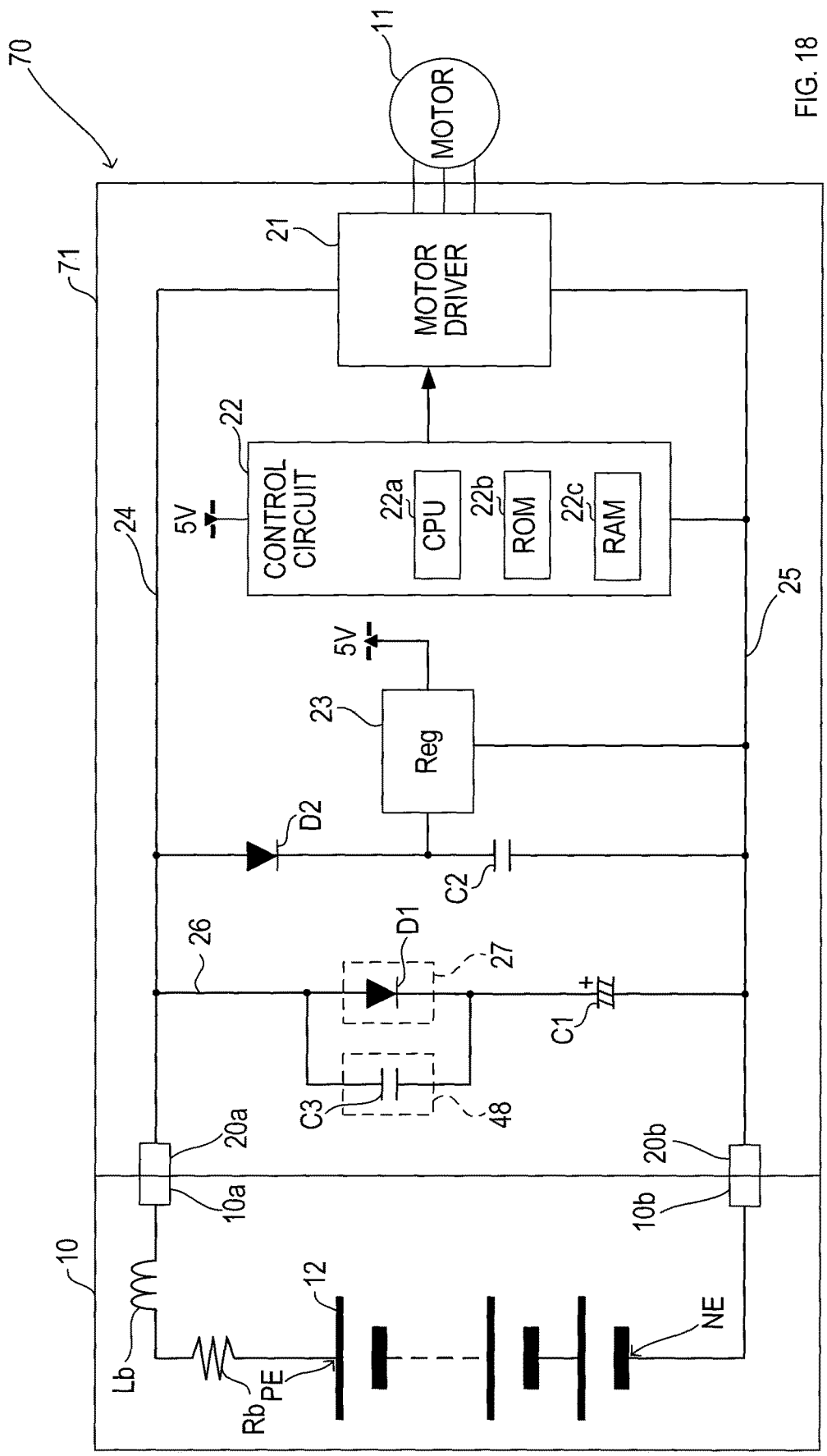
FIG. 18 is a block diagram showing an electrical configuration of still another embodiment.

In the first embodiment shown in FIG. 2 and the second embodiment shown in FIG. 9, the rectifier 27 may be disposed between the first capacitor C1 and the power-supply line 24. Each of FIG. 17 and FIG. 18 illustrates one example of an electric powered work machines 60, 70, in which the rectifiers 27, 47 are disposed between the first capacitor C1 and the power-supply line 24. In a controller 61 of the electric powered work machine 60 and a controller 71 of the electric powered work machine 70, the rectifiers 27, 47 are connected in series with the first capacitor C1 between the power-supply line 24 and the first capacitor C1.

In each of FIG. 17 and FIG. 18, a cathode of the first diode D1 is connected to the first capacitor C1.

In the third embodiment, if the voltage level of the first input port P1 is set to a high level and thereby the voltage of the second input port P2 is changed, then it is determined that a failure occurs in the electric powered work machine 50. In place of or in addition to this, if the voltage level of the first input port P1 is set to a low level and thereby the voltage of the second input port P2 is changed, then it may be determined that a failure occurs in the electric powered work machine 50.

The technique of the present disclosure may be applied to various job-site electric apparatuses used in job-sites, such as do-it-yourself carpentry, manufacturing, gardening, construction, and so on. Specifically, the technique of the present disclosure may be applied to, for example, electric power tools for masonry work, metalworking, or woodworking, working machines for gardening, electric apparatuses for preparing the environments of job sites. More specifically, the technique of the present disclosure may be applied to various electric working machines, such as an electric hammer, an electric hammer drill, an electric drill, an electric driver, an electric wrench, an electric grinder, an electric circular saw, an electric reciprocating saw, an electric jigsaw, an electric cutter, an electric chainsaw, an electric plane, an electric pile driver (including a riveter), an electric hedge trimmer, an electric mower, an electric lawn clipper, an electric grass cutter, an electric cleaner, an electric blower, an electric sprayer, an electric spreader, an electric dust collector.

A plurality of functions performed by a single element in the above-described embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. Moreover, at least a part of a configuration in the above-described embodiments may be added to, or may replace, another configuration in the above-described embodiments.

Furthermore, the present disclosure can be achieved by, in addition to the above-described electric powered work machines 1, 40, 50, 60, 70, various ways including a program for a computer to function as the controllers 20, 41, 51, 61, 71, a non-transitory recording medium, such as a semiconductor memory, having this program recorded therein, or a method for controlling an electric powered work machine.

What is claimed is:

1. An electric circular saw, comprising:
a circular-shaped saw blade;
a battery including a positive electrode and a negative electrode;
a motor configured to be driven with an electric power supplied from the battery, the motor being configured to generate a rotational driving force;
a handle configured to be gripped by a user of the circular saw;
a trigger switch configured to be pulled by the user;
a power-supply line connecting the positive electrode to the motor;
a ground line connecting the negative electrode to the motor;
a connecting line connecting the power-supply line to the ground line;
a first capacitor disposed on the connecting line, the first capacitor having a first end and a second end, the first end being connected to the power-supply line;
a diode disposed on the connecting line, the diode having an anode and a cathode, the anode being connected to the second end of the first capacitor, the cathode being connected to the ground line; and
a resistor connected between the anode and the cathode.

2. An electric powered work machine, comprising:
a motor configured to be driven with an electric power supplied from a battery, the battery including a positive electrode and a negative electrode;
a first line connecting the positive electrode to the motor;
a second line connecting the negative electrode to the motor;
a third line connecting the first line to the second line;
a first capacitor disposed on the third line,
a rectifier disposed on the third line, the rectifier being configured to limit or inhibit an electric current flowing from the second line to the first line through the third line; and
a first circuit connected to the third line to bypass the rectifier, the first circuit having impedance that is other than zero.

3. The electric powered work machine according to claim 2,
wherein the first circuit includes a resistor.

4. The electric powered work machine according to claim 3, further comprising a control circuit configured to control a supply of the electric power from the battery to the motor based on a pulse-width modulation signal, the pulse-width modulation signal having a first frequency,
wherein a circuit includes the first capacitor and the resistor, the circuit having a cutoff frequency higher than the first frequency.

5. The electric powered work machine according to claim 2,
wherein the first circuit includes a second capacitor.

6. The electric powered work machine according to claim 5,
wherein the first capacitor includes a first capacitance,
wherein the second capacitor includes a second capacitance, and
wherein the second capacitance is smaller than the first capacitance.

7. The electric powered work machine according to claim 2, further comprising a field effect transistor, the field effect transistor including the rectifier and the first circuit.

8. The electric powered work machine according to claim 7, further comprising:
a first control circuit configured to control a supply of the electric power from the battery to the motor based on a pulse-width modulation signal, the pulse-width modulation signal having a duty ratio, the first control circuit configured to perform:
a power-supply-ON operation that includes supplying the electric power from the battery to the motor in accordance with the duty ratio, and
a power-supply-OFF operation that includes interrupting the supply of the electric power from the battery to the motor in accordance with the duty ratio; and
a second control circuit configured to alternately switch ON and OFF the field effect transistor, the second control circuit configured to (i) turn ON the field effect transistor at a first timing, (ii) turn OFF the field effect transistor in an ON state, which is turned ON at the first timing, at a second timing, the first timing corresponding to a time point earlier by a first time period than a start of the power-supply-OFF operation, or later by a second time period than the start of the power-supply-OFF operation, the second timing corresponding to a time point earlier by a third time period than a first start of the power-supply-ON operation after the first timing.

9. The electric powered work machine according to claim 8,
wherein the first timing corresponds to a time point immediately before the power-supply-OFF operation starts, or immediately after the power-supply-OFF operation starts.

10. The electric powered work machine according to claim 7, further comprising:
a first control circuit configured to control a supply of the electric power from the battery to the motor based on a pulse-width modulation signal, the pulse-width modulation signal having a duty ratio, the first control circuit configured to perform a power-supply-ON operation that includes supplying the electric power from the battery to the motor in accordance with the duty ratio; and
a second control circuit configured to alternately switch ON and OFF the field effect transistor, the second control circuit configured to turn ON the field effect transistor at a third timing, the third timing corresponding to a time point earlier by a fourth time period than a start of the power-supply-ON operation, or a time point at the start of the power-supply-ON operation, the second control circuit being configured to turn OFF the field effect transistor in an ON state that is turned ON at the third timing.

11. The electric powered work machine according to claim 2,
wherein the rectifier is disposed between the first capacitor and the second line.

12. The electric powered work machine according to claim 2,
wherein the rectifier is disposed between the first line and the first capacitor.

13. The electric powered work machine according to claim 2, further comprising:
a first measurement device configured to measure a surge voltage and a battery voltage while driving of the motor is stopped, the surge voltage occurring between the first line and the second line, the battery voltage corresponding to a voltage of the battery; and
a first processor configured to execute a first processing in response to the surge voltage or the battery voltage being not greater than a first threshold or not less than a second threshold, the first threshold being smaller than the second threshold, the surge voltage or the battery voltage being measured by the first measurement device.

14. The electric powered work machine according to claim 13,
wherein the first processing includes determining that a failure occurs in the electric powered work machine.

15. The electric powered work machine according to claim 2, further comprising:
a second measurement device configured to measure a surge voltage and a battery voltage while the motor is driven, the surge voltage occurring between the first line and the second line, the battery voltage corresponding to a voltage of the battery; and
a second processor configured to execute a second processing in response to a difference between the surge voltage and the battery voltage being out of a first range, the surge voltage and the battery voltage being measured by the second measurement device.

16. The electric powered work machine according to claim 15,
wherein the second processing includes determining that a failure occurs in the electric powered work machine.

17. The electric powered work machine according to claim 2, further comprising:
a control circuit including:
a first port configured to receive a first signal in accordance with a magnitude of a battery voltage, the battery voltage corresponding to a voltage of the battery, and
a second port configured to receive a second signal in accordance with a magnitude of a surge voltage, the surge voltage occurring between the first line and the second line,
a level setter configured to set a voltage level of a target port to a high level or a low level, the target port corresponding to the first port or the second port, and
a third processor configured to execute a third processing in response to a change in a voltage of a non-target port, the change resulting from setting the voltage level of the target port to the high level or the low level by the level setter, the non-target port being the first port or the second port that is different from the target port.

18. The electric powered work machine according to claim 17,
wherein the third processing includes determining that a failure occurs in the electric powered work machine.

19. A method for suppressing a surge voltage in an electric powered work machine, the method comprising:

disposing a first capacitor in an electric powered work machine, the electric powered work machine including a motor, a first line, a second line, and a third line, the first line connecting a positive electrode of a battery to the motor, the second line connecting a negative electrode of the battery to the motor, the third line connecting the first line to the second line, the first capacitor being disposed on the third line;

disposing a rectifier the third line, the rectifier configured to limit or inhibit an electric current flowing from the second line to the first line through the third line; and connecting a first circuit to the third line to bypass the rectifier, the first circuit having impedance that is other than zero.

* * * * *